(12) United States Patent
Murayama et al.

(10) Patent No.: US 8,960,049 B2
(45) Date of Patent: Feb. 24, 2015

(54) VEHICLE BRAKE SYSTEM

(75) Inventors: Kazuaki Murayama, Saitama (JP);
Takaaki Ohnishi, Saitama (JP); Toru Mabuchi, Saitama (JP); Kaoru Akahane, Saitama (JP); Kazuyoshi Akutsu, Saitama (JP); Tomoaki Kotaki, Saitama (JP); Takehiro Horiuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/885,489

(22) PCT Filed: Nov. 10, 2011

(86) PCT No.: PCT/JP2011/075900
§ 371 (c)(1),
(2), (4) Date: Aug. 30, 2013

(87) PCT Pub. No.: WO2012/067004
PCT Pub. Date: May 24, 2012

(65) Prior Publication Data
US 2013/0333376 A1    Dec. 19, 2013

(30) Foreign Application Priority Data

Nov. 17, 2010  (JP) ................................ 2010-257137
Nov. 17, 2010  (JP) ................................ 2010-257329
Nov. 17, 2010  (JP) ................................ 2010-257354

(51) Int. Cl.
*B60T 7/06*    (2006.01)
*B60T 7/00*    (2006.01)
(Continued)

(52) U.S. Cl.
CPC . *B60T 7/00* (2013.01); *B60T 7/042* (2013.01); *B60T 13/745* (2013.01); *B60T 8/1755* (2013.01); *B60T 8/4081* (2013.01); *B60T 2270/304* (2013.01)
USPC ................. 74/512; 74/560; 189/152; 303/20; 180/315

(58) Field of Classification Search
CPC ......... B60T 7/06; B60T 7/065; B60T 13/745; B60T 13/741; B60T 13/565; B60T 13/567; B60T 13/5675; B60T 8/368; B60T 8/3685; G05G 1/46
USPC ........... 180/315; 74/512, 513, 560; 188/1.11, 188/152; 303/20
See application file for complete search history.

(56) References Cited

U.S. PATENT DOCUMENTS 4,353,430 A * 10/1982 Sjoqvist et al. ................. 180/90
4,662,237 A    5/1987 Kami et al.
(Continued)

FOREIGN PATENT DOCUMENTS

CN    201385659 Y    1/2010
JP    S59-177547 U   11/1984
(Continued)

OTHER PUBLICATIONS

Decision of Rejection received in counterpart Japanese patent application JP 2010-257354, dispatched from the JPO on Feb. 2, 2014.
(Continued)

*Primary Examiner* — Ruth Ilan
*Assistant Examiner* — Darlene P Condra
(74) *Attorney, Agent, or Firm* — Carrier Blackman & Associates, P.C.; Joseph P. Carrier; William D. Blackman

(57) ABSTRACT

The purpose of the present invention is to provide a vehicle brake system having a high degree of mounting freedom. The present vehicle brake system is configured in such a manner that an input device into which braking operation of the operator is inputted and a motor cylinder device which generates hydraulic brake pressure on the basis of an electric signal according to at least the braking operation are disposed so as to be separated from each other in the engine room partitioned in front of the dashboard. The vehicle brake system is characterized in that the input device is disposed behind a power device in such a manner that at least a part of the input device overlaps the power device in the front-rear direction.

30 Claims, 11 Drawing Sheets

(51) Int. Cl.
*B60T 7/04* (2006.01)
*B60T 13/74* (2006.01)
*B60T 8/1755* (2006.01)
*B60T 8/40* (2006.01)

(56) References Cited

U.S. PATENT DOCUMENTS

| | | | |
|---|---|---|---|
| 5,410,880 A * | 5/1995 | Schluter | 60/547.1 |
| 8,538,653 B2 | 9/2013 | Miyajima et al. | |
| 2002/0019693 A1 * | 2/2002 | Minowa et al. | 701/70 |
| 2003/0201669 A1 * | 10/2003 | Yokoyama et al. | 303/113.4 |
| 2008/0210499 A1 * | 9/2008 | Isono et al. | 188/72.4 |
| 2010/0154581 A1 * | 6/2010 | Sukonthapanich | 74/512 |
| 2010/0231031 A1 * | 9/2010 | Takahashi et al. | 303/5 |

FOREIGN PATENT DOCUMENTS

| | | |
|---|---|---|
| JP | 2005-324663 A | 11/2005 |
| JP | 2007-269171 A | 10/2007 |
| JP | 2008-265405 A | 11/2008 |
| JP | 2008-273374 A | 11/2008 |
| JP | 2010-023594 A | 2/2010 |
| JP | 2010-095008 A | 4/2010 |
| JP | 2010-208393 A | 9/2010 |

OTHER PUBLICATIONS

Chinese Office Action received Nov. 15, 2014 from SIPO with respect to the counterpart CN Patent Application 201180055186.5 and English translation thereof.

* cited by examiner

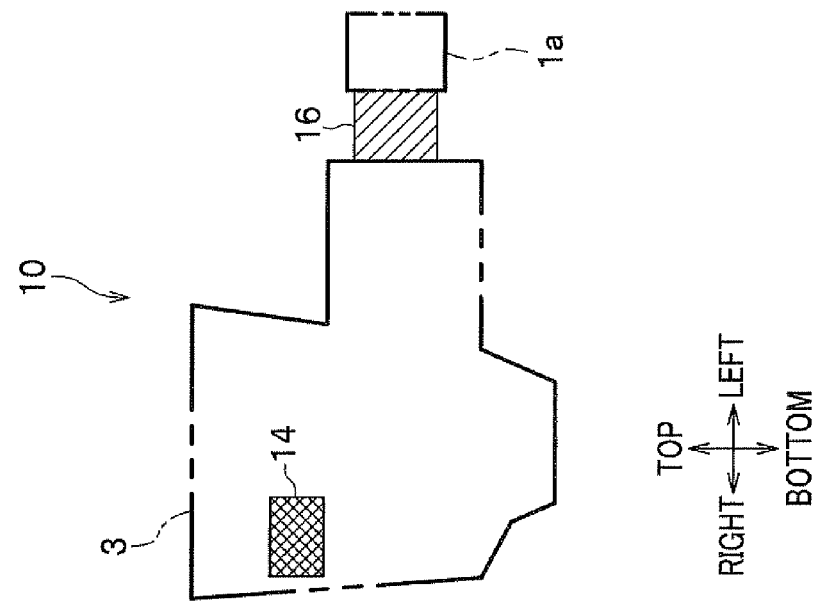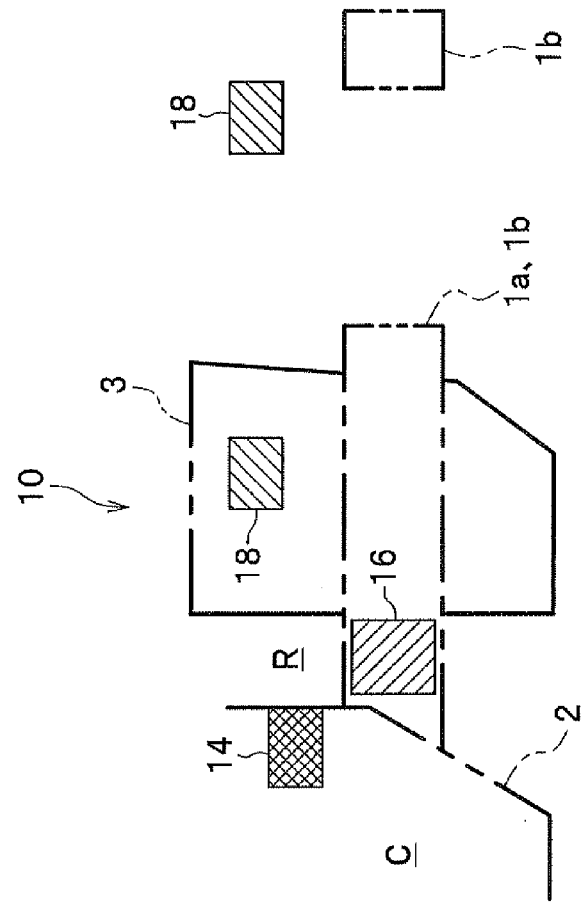

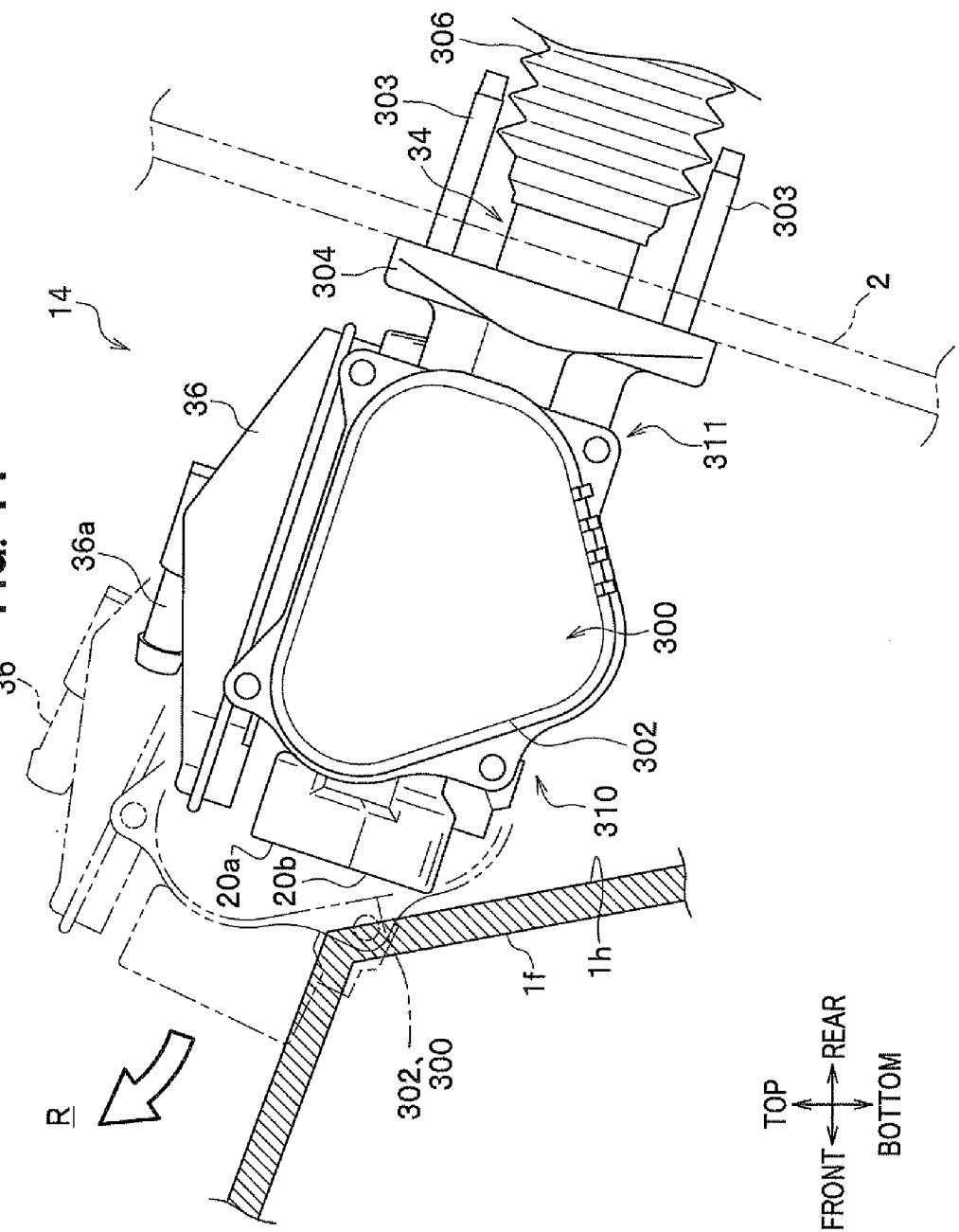

VEHICLE BRAKE SYSTEM

TECHNICAL FIELD

The present invention relates to vehicle brake systems.

BACKGROUND ART

Conventionally, it has been known that examples of a vehicle (automobile) brake system include those having a servo unit such as a negative pressure booster and an oil pressure booster. In addition, an electric servo unit using an electric motor as a power source has recently been known (see, for example, Patent Literature 1).

Patent Literature 1 discloses an electric servo unit including: a main piston which moves back and forth by brake pedal operation; a tubular booster piston which is fitted to the main piston in such a manner as to enable its position to be relatively changed; and an electric motor which moves the booster piston back and forth.

This electric servo unit uses the main piston and the booster piston as pistons of a master cylinder. The front end of each piston faces a pressure chamber of the master cylinder. An operator inputs a thrust to the main piston by using a brake pedal. Also, the electric motor inputs a booster thrust to the booster piston. Accordingly, these thrusts can generate a brake hydraulic pressure in the master cylinder.

CITATION LIST

Patent Literature

[Patent Literature 1] JP 2010-23594 A

SUMMARY OF INVENTION

Technical Problem

Patent Literature 1 discloses an electric servo unit including: a mechanism which generates a hydraulic pressure input through a brake pedal; and a mechanism which generates a hydraulic pressure input through an electric motor, wherein these mechanisms are integrated. Unfortunately, this configuration makes the whole unit tend to become larger and impairs its mounting freedom.

The present invention resolves the above previous problems. It is an object of the present invention to provide a vehicle brake system capable of increasing a mounting freedom.

Solution to Problem

The present invention, which has solved the above problems, provides a vehicle brake system including: an input device which receives an operator's brake operation; and an electric brake actuator which generates a brake hydraulic pressure based on an electric signal according to at least the brake operation, wherein the input device and the electric brake actuator are separately disposed from each other in a room having a power device, the room being partitioned in front of a dashboard; the input device is disposed in rear of the power device; and at least a part of the input device and the power device overlap in a front-rear direction.

According to this vehicle brake system, the input device and the electric brake actuator are separately disposed from each other. This configuration differs from that of a conventional vehicle brake system including an electric servo unit (see, for example, Patent Literature 1) that tends to become larger, and makes it possible to further increase the mounting freedom in a room having a power device (e.g., an engine room), which room has a limited housing space.

In addition, according to this vehicle brake system, an input device which receives an operator's brake operation and an electric brake actuator which generates a brake hydraulic pressure can be separately disposed. Accordingly, the operator can be situated in a distance from the electric brake actuator. Thus, this vehicle brake system can reduce discomfort (uncomfortable feeling) of the operator even if the electric brake actuator generates noise and vibration.

In addition, the input device that is separately disposed from the electric brake actuator in this vehicle brake system is compared with a conventional electric servo unit (see, for example, Patent Literature 1) in which a main piston and a booster piston are coaxially arranged. The length of the input device can be shortened in a front-rear direction when the input device is disposed in a room having a power device (e.g., an engine room). Accordingly, when at least a part of the input device and the power device (e.g., an engine) overlap at the rear side in the front-rear direction, this configuration makes it possible to secure a more sufficient crash stroke than that of the conventional electric servo unit.

In addition, in such a vehicle brake system, the input device can keep its front end position either at substantially the same as a front tip position of the dashboard or at a more rear position than the front tip position so as to adjust the front end position in a front-rear direction.

In this vehicle brake system, even if a power device (e.g., an engine) moves backward to reach a position of a dashboard at the time of a vehicle crash, the power device (e.g., an engine) either simultaneously comes into contact with the input device and the dashboard or first contacts the dashboard, followed by the input device. Thus, if the power device (e.g., an engine) should move backward to reach the position of the dashboard, this vehicle brake system helps avoid backward movement of the input device alone. Consequently, when the power device (e.g., an engine) moves backward to reach the position of the dashboard, crash safety of the operator (driver) markedly improves.

In addition, such a vehicle brake system further preferably includes a vehicle behavior-stabilizing device which assists vehicle behavior stabilization based on the brake hydraulic pressure generated in the electric brake actuator, wherein at least one of the electric brake actuator and the vehicle behavior-stabilizing device is disposed in front of the input device and at a lateral side of the power device.

According to this vehicle brake system, at least one of the electric brake actuator and the vehicle behavior-stabilizing device which are disposed in front of the input device fails to interfere with the power device (e.g., an engine) even if the power device (e.g., an engine) moves backward at the time of a vehicle crash. This configuration can thus secure a sufficient crash stroke while keeping an increased mounting freedom.

In addition, in such a vehicle brake system, the input device may include: a master cylinder attached to the dashboard, a portion of the master cylinder penetrating through the dashboard; and a simulator housing interposed between the dashboard and the power device.

This vehicle brake system includes the simulator housing between the power device and a portion of the dashboard attached to the master cylinder, so that a collision load can be imposed via the simulator housing (simulator) on the dashboard portion attached to the master cylinder. Hence, this vehicle brake system can disperse and reduce the collision load imposed on the dashboard.

In addition, in such a vehicle brake system, the input device may include a fragile portion between the dashboard and the power device.

According to this vehicle brake system, the fragile portion is preferentially broken or crushed, so that the load imposed on the input device can be absorbed. Accordingly, when the power device (e.g., an engine) moves backward to come into contact with the input device at the time of a vehicle crash, this vehicle brake system can make the power device (e.g., an engine) approach the dashboard while absorbing the load. This can markedly improve crash safety of the operator (driver).

In addition, in such a vehicle brake system, the input device may further include a sensor unit (a sensor bulb unit or a bulb unit; hereinafter, the same applies to the term) disposed in parallel to the master cylinder, wherein the fragile portion is interposed between the master cylinder and the sensor unit.

In addition, in such a vehicle brake system, the input device may include: a master cylinder attached to the dashboard, a portion of the master cylinder penetrating through the dashboard; and a sensor unit attached to the master cylinder, wherein the sensor unit is disposed at a position in which a load is imposed through the power device or a front wheel damper of a vehicle when the power device or the front wheel damper moves backward.

As used herein, the term "front wheel damper" includes a damper housing. Also, since a large oil pressure is applied to the master cylinder, the master cylinder is made of parts having a highly rigid structure. In contrast, the sensor unit is made of parts having a lower rigidity than the master cylinder.

According to this vehicle brake system, the sensor unit can be deformed or broken, thereby absorbing the load imposed on the input device and decreasing an amount of backward movement induced by the imposed load.

In addition, according to this vehicle brake system, the input device and the electric brake actuator are separately disposed from each other. This configuration differs from that of a conventional vehicle brake system including an electric servo unit (see, for example, Patent Literature 1) that tends to become larger, and makes it possible to further increase a mounting freedom in a room having a power device (e.g., an engine room), which room has a limited housing space.

In addition, according to this vehicle brake system, an input device which receives an operator's brake operation and an electric brake actuator which generates a brake hydraulic pressure can be separately disposed. Accordingly, the operator can be situated in a distance from the electric brake actuator. Thus, this vehicle brake system can reduce discomfort (uncomfortable feeling) of the operator even if the electric brake actuator generates noise and vibration.

In addition, the input device that is separately disposed from the electric brake actuator in this vehicle brake system is compared with a conventional electric servo unit (see, for example, Patent Literature 1) in which a main piston and a booster piston are coaxially arranged. The length of the input device can be shortened in a front-rear direction when the input device is disposed in a room having a power device (e.g., an engine room). Accordingly, when the input device is disposed in rear of the power device (e.g., an engine) and the sensor unit and the power device overlap in the front-rear direction, this configuration makes it possible to secure a more sufficient crash stroke than that of the conventional electric servo unit.

In addition, in such a vehicle brake system, the sensor unit may include a fragile portion.

According to this vehicle brake system, the fragile portion formed in the sensor unit is preferentially broken or crushed, so that the load imposed on the input device can be efficiently absorbed. Accordingly, when the power device (e.g., an engine) or the front wheel damper moves backward to come into contact with the input device at the time of a vehicle crash, this vehicle brake system can make the power device (e.g., an engine) approach the dashboard while absorbing the load.

In addition, in such a vehicle brake system, the sensor unit may include: a bulb disposed partway through a hydraulic passage extending from the master cylinder; an electric circuit board electrically connected to the bulb; and a housing attached to the master cylinder, the housing including the bulb and the electric circuit board, wherein the fragile portion is formed in the housing at a side beside the master cylinder.

When the fragile portion formed in the housing is broken or crushed, this vehicle brake system can help prevent, for example, a short circuit from occurring because the bulb and the electric circuit board included in the housing move all at once.

Also, in such a vehicle brake system, the input device is attached to the dashboard. Accordingly, a position opposite to the side at which the dashboard is attached in a front-rear direction of a vehicle is characterized by having a slope that makes it possible to pull out the input device along a structure included in the room for structures.

This vehicle brake system may include: an input device which receives operation of a brake operator; and an electric brake actuator which generates a brake hydraulic pressure based on an electric signal according to at least the operation, wherein the input device and the electric actuator are separately disposed from each other in a room for structures, the room being formed in front of a dashboard in a vehicle. This configuration makes it possible to make the devices smaller than those which have been integrated into one device. Thus, the room formed in front of the dashboard in the vehicle can have an increased mounting freedom.

That is, the room for structures carries various devices, as structures, such as not only brake-related devices but also a power source (an engine and/or a drive motor), a transmission, a cooling system (e.g., a radiator), and a low-voltage battery. This should make it difficult to keep a large empty space (installation space). The present invention, however, has a configuration in which an input device and an electric brake actuator are separated from each other. This configuration can make the size of each device smaller and can make it unnecessary to keep a large empty space. Each device can therefore be mounted even in a narrow empty space.

Also, this vehicle brake system has a configuration in which an input device and an electric brake actuator are separated from each other, thereby increasing general-purpose properties of each device and making it easier to use each device in different car models.

Further, this vehicle brake system has a separate (individual) input device and electric brake actuator, so that the electric brake actuator, which may be a source of generating noise and vibration, can be separately disposed from a driver. This configuration can help prevent the driver from experiencing discomfort (uncomfortable feeling) due to the noise and vibration.

Moreover, the input device is attached to the dashboard, and a position opposite to the side at which the dashboard is attached in the front-rear direction of a vehicle has a slope that makes it possible to pull out the input device along a structure included in the room for structures. Accordingly, when the input device is removed from the dashboard at maintenance, etc., the operation can be easily performed.

That is, when the input device is removed from the dashboard, the input device can be pulled out along the slope against a structure included in the room for structures in a forward direction in the room. As a result, the input device can be suitably removed from the dashboard while avoiding the structure included in the room for structures. This configuration is therefore excellent in maintenance properties.

In addition, in such a vehicle brake system, the input device may include a sensor unit, wherein the slope is formed at the sensor unit.

According to this vehicle brake system, when the input device is removed from the dashboard, the input device can be pulled out along the slope formed at the sensor unit against a structure included in the room for structures in a forward direction in the room. This configuration makes it possible to suitably remove the input device from the dashboard while avoiding the structure included in the room for structures.

Also, when the input device is removed from the dashboard, the sensor unit does not present a hindrance to the structure. Consequently, the input device is suitably equipped with the sensor unit at its side, etc., thereby increasing a design choice of its own.

In addition, in such a vehicle brake system, the input device may include: a master cylinder; and a stroke simulator disposed in parallel to the master cylinder, the stroke simulator giving a brake operator a simulated operation reaction force, wherein the slope is formed at a stroke simulator side.

According to this vehicle brake system, when the input device is removed from the dashboard, the input device can be pulled out along the slope formed at the stroke simulator side against a structure included in the room for structures in a forward direction in the room. This configuration makes it possible to suitably remove the input device from the dashboard while avoiding the structure included in the room for structures.

Also, when the input device is removed from the dashboard, the stroke simulator side does not present a hindrance to the structure. This configuration allows the master cylinder to be suitably disposed in parallel to the stroke simulator, thereby increasing a design choice of the input device.

In addition, in such a vehicle brake system, the structure may be auxiliary equipment included in a damper housing and/or a power device.

According to this vehicle brake system, the input device can be pulled out along the slope against the auxiliary equipment included in the damper housing and/or the power device in a forward direction in the room for structures. This configuration makes it possible to suitably remove the input device from the dashboard while avoiding the structure included in the room for structures.

Thus, the input device easily removable at maintenance, etc., can be suitably arranged around auxiliary equipment included in a damper housing and/or a power device, which are a major structure in the room for structures, without modifying a layout of the auxiliary equipment.

Advantageous Effects of Invention

The present invention can provide a vehicle brake system capable of increasing a mounting freedom.

BRIEF DESCRIPTION OF DRAWINGS

FIG. 2 is a schematic representation of how to arrange a vehicle brake system according to the first embodiment. FIG. 2A represents a configuration viewed from a side of a vehicle. FIG. 2B represents a configuration viewed from the front of the vehicle.

FIG. 7 is schematic diagrams illustrating how the vehicle brake system according to the second embodiment of the present invention looks like when viewed from the top of a vehicle.

FIG. 11 is a side view illustrating an action when the input device according to the third embodiment is removed.

DESCRIPTION OF EMBODIMENTS

Figure 1:
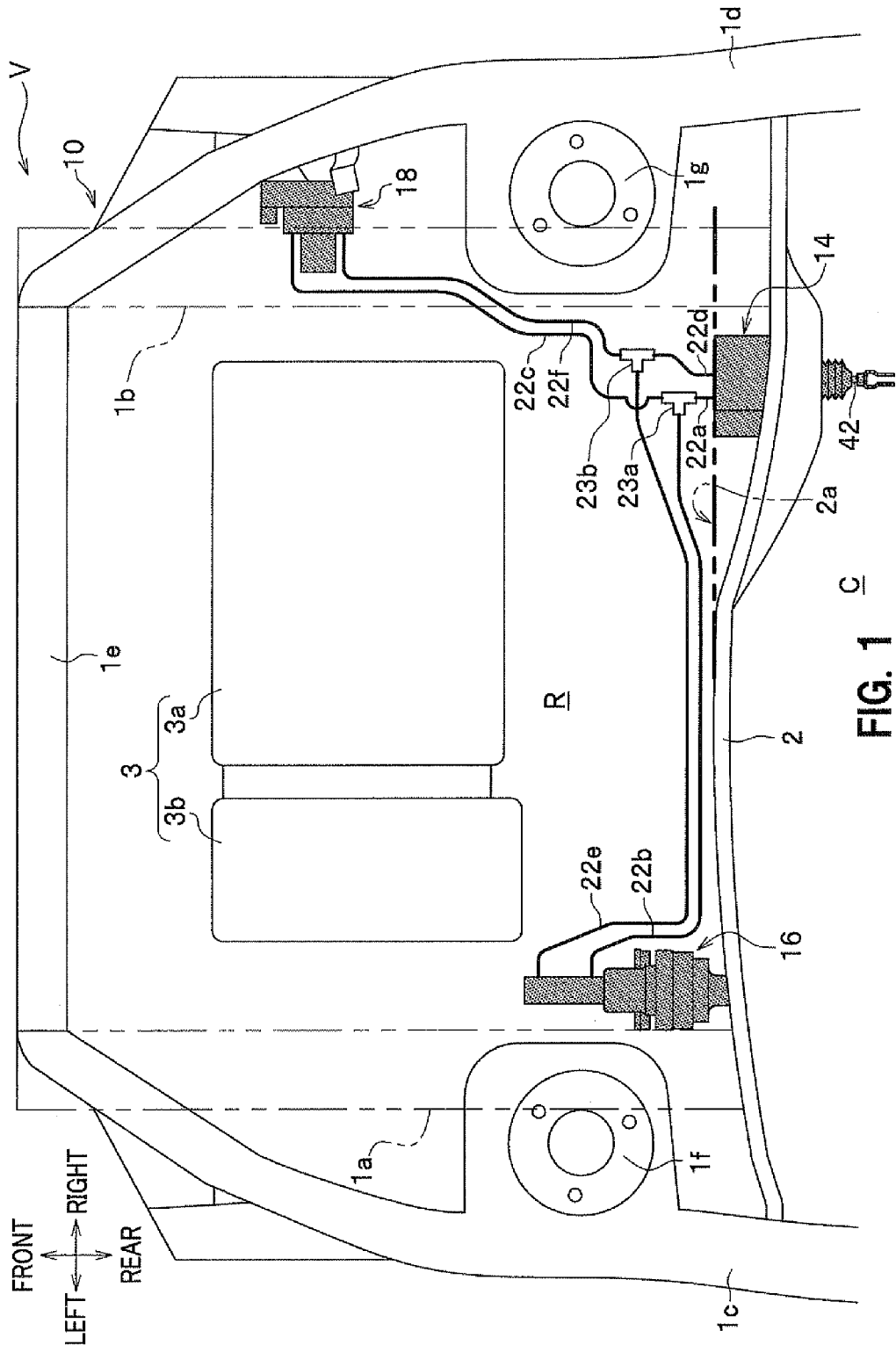
FIG. 1 illustrates how to configure, in a vehicle, a vehicle brake system according to the first embodiment of the present invention.

The following details embodiments of the present invention by appropriately referring to the drawings.

(First Embodiment)

A vehicle brake system according to the present invention is largely characterized in that: an input device and an electric brake actuator as components are separately disposed from each other; and a configuration specific to the input device is employed.

The following describes a general configuration of a vehicle brake system according to an embodiment of the present invention that is applied to a right-hand drive vehicle. Then, an input device is further detailed. Note that a vehicle brake system according to the present invention is not limited to the right-hand drive vehicle but can be applied to a left-hand drive vehicle.

<General Configuration of Vehicle Brake System>

The following describes a vehicle brake system according to this embodiment as an example, the system including both a by-wire brake system which actuates a brake by transmitting an electric signal and an conventional oil-pressure brake system which actuates a brake by transferring an oil pressure as a fail-safe mechanism. The front-rear, top-bottom, and left-right directions in the following description agree with the front-rear, top-bottom, and left-right directions of a vehicle. The front-rear, top-bottom, and left-right directions illustrated in FIG. 1 are set as reference directions.

As illustrated in FIG. 1, a vehicle brake system 10 basically includes: an input device 14 into which an operator inputs brake operation; a motor cylinder device (an electric brake actuator) 16 which generates a brake hydraulic pressure based on an electric signal according to at least the brake operation; and a Vehicle Stability Assist device 18 (a vehicle behavior-stabilizing device; hereinafter, referred to as the VSA device 18; the term "VSA" is a registered trademark) which assists vehicle behavior stabilization based on the brake hydraulic pressure generated in this motor cylinder device 16, wherein the input device 14, the motor cylinder device 16, and the VSA device 18 are arranged in an engine room R of a vehicle V.

Note that the motor cylinder device 16 may include means for generating a hydraulic pressure based on not only an electric signal according to the driver's brake operation but also an electric signal according to another physical quantity. The electric signal according to another physical quantity means a signal for determining a status surrounding a vehicle V by an ECU (Electronic Control Unit) using, for example, a sensor to avoid collision of the vehicle V without depending on the driver's brake operation. This system is something like an automatic braking system.

An engine room R according to this embodiment is partitioned in front of a dashboard 2 and is surrounded by a configuration including: a pair of front side frames 1a and 1b disposed at both left and right sides in a widthwise direction and extended along a vehicle V in a front-rear direction; a pair of upper members 1c and 1d disposed at an upper location with a predetermined distance from the pair of front side frames 1a and 1b and extended along a vehicle body in a front-rear direction; a bulk head connector 1e including an approximately rectangular framework made of a plurality of members connected to front ends of the pair of front side frames 1a and 1b; and damper housings 1f and 1g disposed at rear positions of the pair of upper members 1c and 1d in a front-rear direction, each housing supporting a strut (not shown). Note that the strut (not shown) is constructed as a front wheel damper including, for example, a coiled spring which absorbs a shock and a shock absorber which reduces vibration.

In this regard, however, a vehicle framework such as the bulk head connector 1e, the front side frames 1a and 1b, and the upper members 1c and 1d can secure a sufficient crash stroke because the members are crushed in sequence from the front to the rear at the time of a crash of the vehicle V. This structure can efficiently absorb the impact energy.

Also, the engine room R has the vehicle brake system 10 as well as structures such as the power device 3. The power device 3 is used for a hybrid vehicle in which an engine 3a, an electric motor (a drive motor) 3b, and a transmission (not shown), for example, are combined. The power device 3 is positioned at substantially the center in a space of the engine room R. Note that the left and right front wheels are powered through a transmission mechanism (not shown) by the motor force generated with the engine 3a and the electric motor 3b. In addition, a high-voltage battery (e.g., a lithium ion battery) at which electric power (regenerative power) from the electric motor 3b is charged and which supplies electric power to the electric motor 3b is installed on the underfloor of a vehicle compartment C in the vehicle V and/or in rear of the vehicle compartment C. Note that the vehicle may be any of front-wheel-drive, rear-wheel-drive, and four-wheel-drive vehicles.

Of note is that the power device 3 included in the engine room R is surrounded by various structures (auxiliary equipment) including, in addition to the below-described vehicle brake system 10, an air intake system, an exhaust system, a cooling system, and an electrical system containing a low-voltage battery which supplies electric power to lamps (not shown), etc.

The input device 14 according to this embodiment is used for a right-hand drive vehicle, and is attached using stud bolts 303 (see FIG. 4) to the right side of the dashboard 2 in a widthwise direction. A push rod 42 (see FIG. 4) connected to a brake pedal (a brake operator) 12 (see FIG. 4) penetrates through the dashboard 2 to project into the vehicle compartment C. Note that as described below, a portion of a master cylinder 34 included in the input device 14 extends to the vehicle compartment C.

As illustrated in FIG. 1, the input device 14 is mounted on the dashboard 2 which has a substantially smooth, convex and concave structure in a front-rear direction of the vehicle V. The front end of the input device 14 is disposed and positioned at substantially the same position in a front-rear direction as the front tip position 2a of the dashboard 2. Note that the input device 14 is not limited to the right-hand drive vehicle but can be used for a left-hand drive vehicle.

The motor cylinder device 16 is disposed at a left side, which is the opposite side of the input device 14, in a widthwise direction of a vehicle. For example, the motor cylinder device 16 is mounted via a bracket (not shown) on the left front side frame 1a. Specifically, the motor cylinder device 16 has an elastic (floating) support on the bracket. A fastener member such as a bolt is used to fasten the bracket on the front side frame 1a. This configuration makes it possible to absorb vibration, etc., generated during operation of the motor cylinder device 16.

Examples of a function of the VSA device 18 include: an ABS (anti-lock brake system) function which prevents wheel lock during braking; a TCS (traction control system) function which prevents wheel spinning during acceleration, etc.; and a function which reduces skid during turning. The VSA device 18 is mounted via, for example, a bracket on the right front side of a vehicle body in a widthwise direction. Note that an ABS device which has only the ABS function to prevent wheel lock during braking can be connected and used as an alternative for the VSA device 18.

As illustrated in FIG. 2A, the input device 14 is disposed in rear of the engine 3a (power device) and positioned at an upper portion than the front side frame 1a (1b).

As illustrated in FIG. 2B, the input device 14 is disposed in rear of the engine 3a, and at least a part of the input device 14 and the engine 3a overlap in a front-rear direction.

In addition, as illustrated in FIGS. 2A and 2B, the motor cylinder device 16 is disposed at a lower position than the input device 14. As detailed, the motor cylinder device 16 has a below-described second reservoir 84 (see FIG. 3) and the second reservoir 84 is disposed at a lower position than a below-described first reservoir 36 (see FIG. 3) included in the input device 14. At that time, a pipe 86 (see FIG. 3) which connects the first reservoir 36 and the second reservoir 84 is disposed so as not to be positioned at a lower position than the second reservoir 84 and between the first reservoir 36 and the second reservoir 84.

In addition, as illustrated in FIG. 2B, the motor cylinder device 16 is interposed between the power device 3 and the front side frame 1a.

Also, the motor cylinder device 16 is disposed in rear of the VSA device 18. But, the position of the motor cylinder device 16 is not limited to the position according to this embodiment, and may be in front of the VSA device 18. Further, the VSA device 18 may be disposed at the same height in a top-bottom direction (a vertical direction) as the motor cylinder device 16 or at a lower position than the motor cylinder device 16. The position of the VSA device can be appropriately modified depending on an empty space of the engine room R. Moreover, the VSA device 18 may be disposed at the same height in a top-bottom direction (a vertical direction) as the input device 14 or at a lower position than the input device 14. The position of the VSA device can be appropriately modified depending on an empty space of the engine room R.

Note that the detailed internal structures of the input device 14, the motor cylinder device 16, and the VSA device 18 are described below.

These input device 14, motor cylinder device 16, and VSA device 18 are connected via hydraulic passages constructed using, for example, metal-made pipe members. These devices constitute a by-wire brake system, and a harness (not shown) is used to electrically connect the input device 14 and the motor cylinder device 16.

Figure 3:
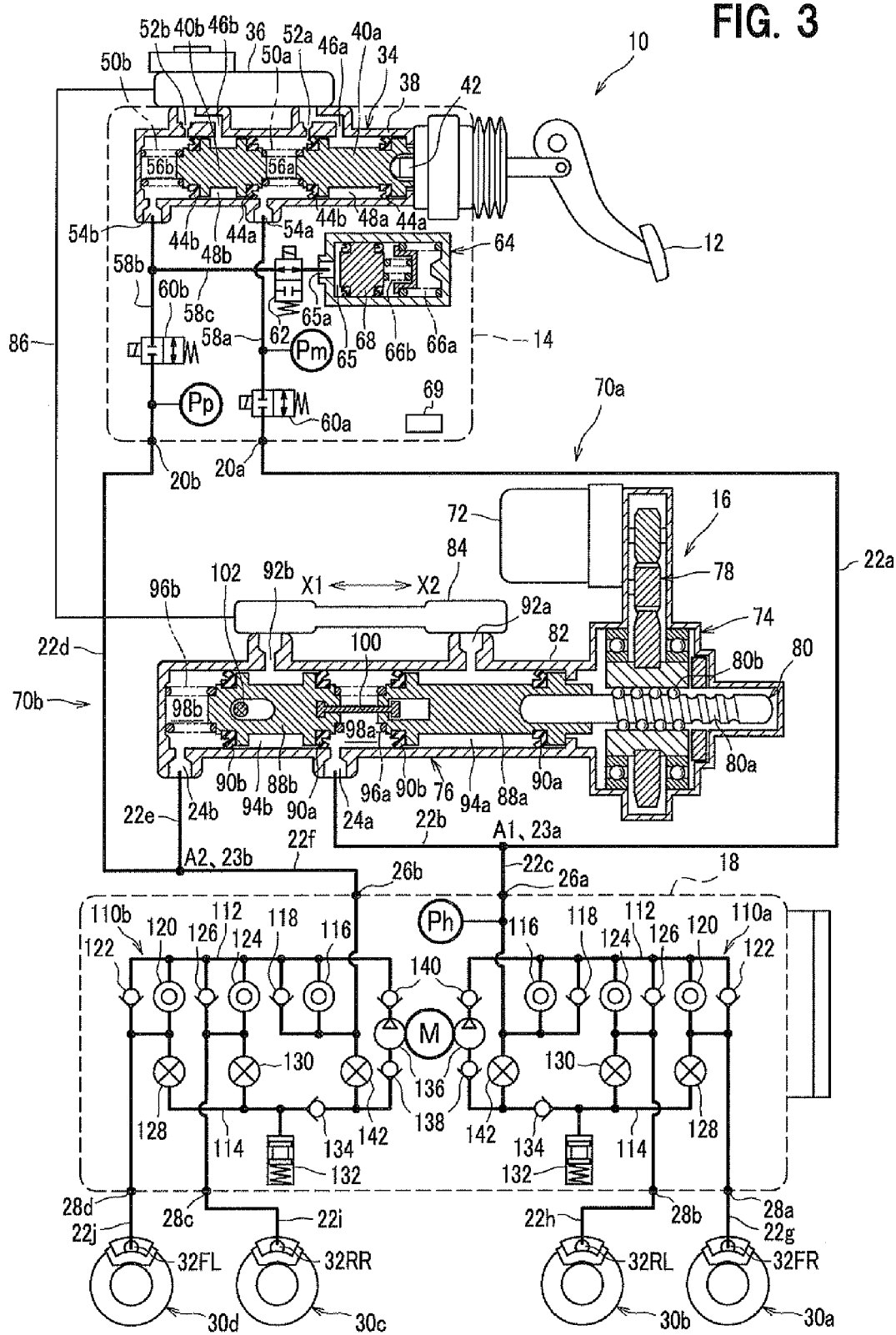
FIG. 3 outlines a vehicle brake system according to the first embodiment of the present invention.

Specifically, the input device 14 and the VSA device 18 are connected each other via a pipe 22a, a joint (a pipe with three branches) 23a, and a pipe 22c as a first hydraulic system 70a (see FIG. 3), and via a pipe 22d, a joint (a pipe with three branches) 23b, and a pipe 22f as a second hydraulic system 70b (see FIG. 3).

In addition, the motor cylinder device 16 is connected via a pipe 22b to the joint 23a as the first hydraulic system 70a (see FIG. 3) and is connected via a pipe 22e to the joint 23b as the second hydraulic system 70b (see FIG. 3).

Hydraulic passages are illustrated with reference to FIG. 3. When a coupler A1 (joint 23a) shown in FIG. 3 is viewed as a reference point, the pipe 22a connects the coupler A1 to a connection port 20a of the input device 14. In addition, the pipe 22b connects the coupler A1 to an output port 24a of the motor cylinder device 16. Further, the pipe 22c connects the coupler A1 to an inlet port 26a of the VSA device 18.

Also, when another coupler A2 (joint 23b) shown in FIG. 3 is viewed as a reference point, the pipe 22d connects the coupler A2 to another connection port 20b of the input device 14. In addition, the pipe 22e connects the coupler A2 to another output port 24b of the motor cylinder device 16. Further, the pipe 22f connects the coupler A2 to another inlet port 26b of the VSA device 18.

The VSA device 18 has a plurality of outlet ports 28a to 28d. A pipe 22g is used to connect the outlet port 28a to a wheel cylinder 32FR of a disk brake mechanism 30a installed at the right front wheel. A pipe 22h is used to connect the outlet port 28b to a wheel cylinder 32RL of a disk brake mechanism 30b installed at the left rear wheel. A pipe 22i is used to connect the outlet port 28c to a wheel cylinder 32RR of a disk brake mechanism 30c installed at the right rear wheel. A pipe 22j is used to connect the fourth outlet port 28d to a wheel cylinder 32FL of a disk brake mechanism 30d installed at the left front wheel.

The pipes 22g to 22j, which are connected to each of the outlet ports 28a to 28d, are used to supply brake fluid to each of the wheel cylinders 32FR, 32RL, 32RR, and 32FL of the disc brake mechanisms 30a to 30d, respectively. An increase in hydraulic pressure of each of the wheel cylinders 32FR, 32RL, 32RR, and 32FL causes each of the wheel cylinders 32FR, 32RL, 32RR, and 32FL to operate. This operation imparts braking force to the corresponding wheels (i.e., a right front wheel, a left rear wheel, a right rear wheel, and a left front wheel).

Note that the vehicle brake system 10 can be installed and mounted on various vehicles including a hybrid vehicle supposed in this embodiment, as well as a fuel cell vehicle, an electric vehicle, and an automobile which can be powered only with an engine (an internal-combustion engine).

The input device 14 includes: a tandem master cylinder 34 which can generate a hydraulic pressure by a driver's operation of a brake pedal 12; and a first reservoir 36 which is provided with the master cylinder 34. A cylinder tube 38 of this master cylinder 34 has two pistons 40a and 40b which is slidably disposed with a predetermined interval in an axial direction of the cylinder tube 38. A first piston is disposed near the brake pedal 12, and is connected via the push rod 42 to the brake pedal 12. In addition, a second piston 40b is disposed at a more distal position from the brake pedal 12 than the first piston 40a.

A pair of piston packing 44a and 44b is fitted via a circular step to the outer periphery of the first and second pistons 40a and 40b, respectively. Back chambers 48a and 48b that are in communication with below-described supply ports 46a and 46b, respectively, are formed between the pair of piston packing 44a and 44b. Meanwhile, a spring member 50a is interposed between the first and the second pistons 40a and 40b. In addition, another spring member 50b is interposed between the second piston 40b and the lateral end of the cylinder tube 38.

Note that instead of using the piston packing 44a and 44b on the outer periphery of the pistons 40a and 40b, packing may be disposed on the inner periphery of the cylinder tube 38.

The cylinder tube 38 of the master cylinder 34 includes two supply ports 46a and 46b, two relief ports 52a and 52b, and two output ports 54a and 54b. In this case, each supply port 46a (46b) and each relief port 52a (52b) are merged, so that they are connected to a reservoir chamber (not shown) of the first reservoir 36.

Also, the cylinder tube 38 of the master cylinder 34 includes a first pressure chamber 56a and a second pressure chamber 56b, both of which generate a brake hydraulic pressure according to pedal force produced by the driver's (operator's) pressing the brake pedal 12. The first pressure chamber 56a is connected via a first hydraulic passage 58a to a connection port 20a. The second pressure chamber 56b is connected via a second hydraulic passage 58b to a connection port 20b.

A pressure sensor Pm is interposed between the master cylinder 34 and the connection port 20a, and is disposed at an upstream position of the first hydraulic passage 58a. A first shut-off valve 60a, which contains a normally open solenoid valve, is disposed at a downstream position of the first hydraulic passage 58a. This pressure sensor Pm detects a hydraulic pressure which is on the first hydraulic passage 58a and is at upstream of the first shut-off valve 60a at the master cylinder 34 side.

A second shut-off valve 60b, which contains a normally open solenoid valve, is interposed between the master cylinder 34 and another connection port 20b, and is disposed at an upstream position of the second hydraulic passage 58b. In addition, a second pressure sensor Pp is disposed at a downstream position of the second hydraulic passage 58b. This second hydraulic pressure sensor Pp detects a hydraulic pressure which is on the second hydraulic passage 58b and is at downstream of the second shut-off valve 60b at the side of the wheel cylinders 32FR, 32RL, 32RR, and 32FL.

The term "normally open" used in the first shut-off valve 60a and the second shut-off valve 60b refers to a condition of a valve which remains an open position state (i.e., open at all times) when the valve is at a normal position (i.e., a valve position when electricity is turned off). Note that FIG. 3 illustrates a state of the first shut-off valve 60a and the second shut-off valve 60b when electricity is turned on (at the time of excitation) (the same applies to a third shut-off valve 62 described below).

The second hydraulic passage 58b between the master cylinder 34 and the second shut-off valve 60b has a hydraulic passage branch 58c which diverges from the second hydraulic passage 58b. A third shut-off valve 62, which contains a normally closed solenoid valve, and a stroke simulator 64 are connected in series on the hydraulic passage branch 58c. The term "normally closed" used in the third shut-off valve 62 refers to a condition of a valve which remains a closed position state when the valve is at a normal position (i.e., a valve position when electricity is turned off).

This stroke simulator 64 produces a stroke and operation reaction force according to operation of the brake pedal 12 when the first shut-off valve 60a and the second shut-off valve 60b are closed. This stroke simulator 64 is positioned upstream of the second shut-off valve 60b at the master cylinder 34 side. Then, the hydraulic passage branch 58c, which diverges from the second hydraulic passage 58b, and a port 65a are used to install the stroke simulator 64. That is, brake fluid discharged from the second pressure chamber 56b of the master cylinder 34 is supplied to a hydraulic chamber 65 of the stroke simulator 64 via the second hydraulic passage 58b, the hydraulic passage branch 58c, and the port 65a.

Also, the stroke simulator 64 includes: a first return spring 66a having a high spring constant and a second return spring 66b having a low spring constant, which are arranged in series; and a simulator piston 68 which is actuated by the first and second return springs 66a and 66b. When the brake pedal 12 is pressed at an early stage, a gradient of pedal reaction force is made to increase at a low rate. When the brake pedal 12 is pressed at a later stage, the pedal reaction force is made to increase at a high rate. This provides substantially the same pedal feeling of the brake pedal 12 as that of the existing master cylinder.

The hydraulic passages are largely classified into a first hydraulic system 70a which connects the first pressure chamber 56a of the master cylinder 34 to a plurality of wheel cylinders 32FR and 32RL and a second hydraulic system 70b which connects the second pressure chamber 56b of the master cylinder 34 to a plurality of wheel cylinders 32RR and 32FL.

The first hydraulic system 70a includes: the first hydraulic passage 58a which connects the connection port 20a to the output port 54a of the master cylinder 34 (cylinder tube 38) of the input device 14; the pipes 22a and 22b which connect the connection port 20a of the input device 14 to the output port 24a of the motor cylinder device 16; the pipes 22b and 22c which connect the output port 24a of the motor cylinder device 16 to an inlet port 26a of the VSA device 18; and pipes 22g and 22h which connect each of outlet ports 28a and 28b of the VSA device 18 to each of the wheel cylinders 32FR and 32RL, respectively.

The second hydraulic system 70b includes: the second hydraulic passage 58b which connects another connection port 20b to the output port 54b of the master cylinder 34 (cylinder tube 38) of the input device 14; the pipes 22d and 22e which connect the connection port 20b of the input device 14 to the output port 24b of the motor cylinder device 16; the pipes 22e and 22f which connect the output port 24b of the motor cylinder device 16 to an inlet port 26b of the VSA device 18; and pipes 22i and 22j which connect each of outlet ports 28c and 28d of the VSA device 18 to each of the wheel cylinders 32RR and 32FL, respectively.

As a result, the first hydraulic system 70a and the second hydraulic system 70b are used to build the hydraulic passages. Consequently, the respective wheel cylinders 32FR and 32RL are independent of the respective wheel cylinders 32RR and 32FL at work. Mutually independent braking force can therefore be generated.

The motor cylinder device 16 includes an actuator mechanism 74 containing an electric motor 72 and a cylinder mechanism 76 actuated by the actuator mechanism 74.

The actuator mechanism 74 functions as an electric brake actuator, and is installed at a side of an output shaft of the electric motor 72. The actuator mechanism 74 includes: a gear mechanism (reduction mechanism) 78 which delivers rotational driving force of the electric motor 72 while a plurality of gears are engaged; and a ball screw structure 80 further including balls 80b and a ball screw shaft 80a which moves back and forth along the shaft direction while the rotational driving force is delivered through the gear mechanism 78.

The cylinder mechanism 76 includes an approximately cylindrical cylinder body 82 and a second reservoir 84 attached to the cylinder body 82. A pipe 86 is used to connect the second reservoir 84 to the first reservoir 36 attached to the master cylinder 34 of the input device 14. Brake fluid stored in the first reservoir 36 is supplied via the pipe 86 to the second reservoir 84.

The cylinder body 82 includes a first slave piston 88a and a second slave piston 88b which are slidably disposed along an axial direction of the cylinder body 82 with a predetermined interval. The first slave piston 88a is positioned near the ball screw structure 80, and comes into contact with an end of the ball screw shaft 80a. Meanwhile, the first slave piston 88a and this ball screw shaft are integrated, thereby changing their position in a direction denoted by the arrow X1 or X2. In addition, the second slave piston 88b is disposed at a more distal position from the ball screw structure 80 than the first slave piston 88a.

A pair of slave piston packing 90a and 90b is fitted via a circular step to the outer periphery of the first and second pistons 88a and 88b. A first back chamber 94a and a second back chamber 48b that are in communication with below-described reservoir ports 92a and 92b, respectively, are formed between the pair of slave piston packing 90a and 90b. A first return spring 96a is interposed between the first slave piston 88a and the second slave piston 88b. A second return spring 96b is interposed between the second slave piston 88b and a lateral end of the cylinder body 82.

The cylinder body 82 of the cylinder mechanism 76 includes two reservoir ports 92a and 92b and two output ports 24a and 24b. In this case, the reservoir port 92a (92b) is connected to a reservoir chamber (not shown) of the second reservoir 84.

In addition, the cylinder body 82 includes: a first hydraulic chamber 98a which controls a brake hydraulic pressure output from the output port 24a to the wheel cylinders 32FR and 32RL side; and a second hydraulic chamber 98b which controls a brake hydraulic pressure output from the output port 24b to the wheel cylinders 32RR and 32FL side.

Note that between the first slave piston 88a and the second slave piston 88b is provided restricting means 100 for restricting the maximum stroke (maximum displacement distance) and the minimum stroke (minimum displacement distance) between the first slave piston 88a and the second slave piston 88b. Moreover, the second slave piston 88b has a stopper pin 102 which restricts a sliding range of the second slave piston 88b and prevents the second slave piston from excessively returning to the first slave piston 88a side. Accordingly, when backup braking is operated using a brake hydraulic pressure generated in the master cylinder 34, in particular, because of failure in one system, this restricting means helps prevent failure of the other system.

The VSA device 18 is a well-known one and includes: a first brake system 110a which controls the first hydraulic system 70a connected to disk brake mechanisms 30a and 30b (wheel cylinder 32FR and wheel cylinder 32RL) corresponding to the right front wheel and the left rear wheel; and a second brake system 110b which controls the second hydraulic system 70b connected to disk brake mechanisms 30c and 30d (wheel cylinder 32RR and wheel cylinder 32FL) corresponding to the right rear wheel and the left front wheel. Note that the first brake system 110a may be composed of a hydraulic system connected to the disk brake mechanisms attached to the left front wheel and the right front wheel. Also note that the second brake system 110b may be composed of a hydraulic system connected to the disk brake mechanisms attached to the left rear wheel and the right rear wheel. Further, the first brake system 110a may be composed of a hydraulic system connected to the disk brake mechanisms attached to the right front wheel and the right rear wheel at one side. Furthermore, the second brake system 11b may be composed of a hydraulic system connected to the disk brake mechanisms attached to the left front wheel and the left rear wheel at the other side.

These first brake system 110a and second brake system 110b each have an identical structure. Accordingly, those corresponding to the first brake system 110a and the second brake system 110b have the same reference signs. The description is focused on the first brake system, and the description regarding the second brake system is indicated in parentheses.

The first brake system 110a (the second brake system 110b) has a first common hydraulic passage 112 and a second common hydraulic passage 114, both of which are shared between the wheel cylinders 32FR and 32RL (32RR and 32FL). The VSA device 18 includes: a regulator valve 116 containing a normally open solenoid valve interposed between the inlet port 26a and the first common hydraulic passage 112; a first check valve 118 which is disposed in parallel to the regulator valve 116 and permits a brake fluid flow from the inlet port 26a to the first common hydraulic passage 112 (blocks a brake fluid flow from the first common hydraulic passage 112 to the inlet port 26a); a first inner valve 120 containing a normally open solenoid valve interposed between the first common hydraulic passage 112 and the outlet port 28a; a second check valve 122 which is disposed in parallel to the first inner valve 120 and permits a brake fluid flow from the outlet port 28a to the first common hydraulic passage 112 (blocks a brake fluid flow from the first common hydraulic passage 112 to the outlet port 28a); a second inner valve 124 containing a normally open solenoid valve interposed between the first common hydraulic passage 112 and the outlet port 28b ; and a third check valve 126 which is disposed in parallel to the second inner valve 124 and permits a brake fluid flow from the outlet port 28b to the first common hydraulic passage 112 (blocks a brake fluid flow from the first common hydraulic passage 112 to the outlet port 28b ).

The VSA device further includes: a first outer valve 128 containing a normally closed solenoid valve interposed between the outlet port 28a and the second common hydraulic passage 114; a second outer valve 130 containing a normally closed solenoid valve interposed between the outlet port 28b and the second common hydraulic passage 114; a reservoir 132 connected to the second common hydraulic passage 114; a fourth check valve 134 which is interposed between the first common hydraulic passage 112 and the second common hydraulic passage 114 and permits a brake fluid flow from the second common hydraulic passage 114 to the first common hydraulic passage 112 (blocks a brake fluid flow from the first common hydraulic passage 112 to the second common hydraulic passage 114); a pump 136 which is interposed between the fourth check valve 134 and the first common hydraulic passage 112 and supplies brake fluid from the second common hydraulic passage 114 to the first common hydraulic passage 112; an intake valve 138 and a discharge valve 140 which are disposed upstream and downstream, respectively, of the pump 136; a motor M which drives the pump 136; and a suction valve 142 which is interposed between the second common hydraulic passage 114 and the inlet port 26a.

Note that in the first brake system 110a, the hydraulic passage proximal to the inlet port 26a has a pressure sensor Ph, which detects a brake hydraulic pressure that is output from the output port 24a of the motor cylinder device 16 and that is controlled in the first hydraulic chamber 98a of the motor cylinder device 16. A detection signal that has been detected with each of the pressure sensors Ps, Pp and Ph is input into control means (not shown).

<Input Device>

Figure 4:
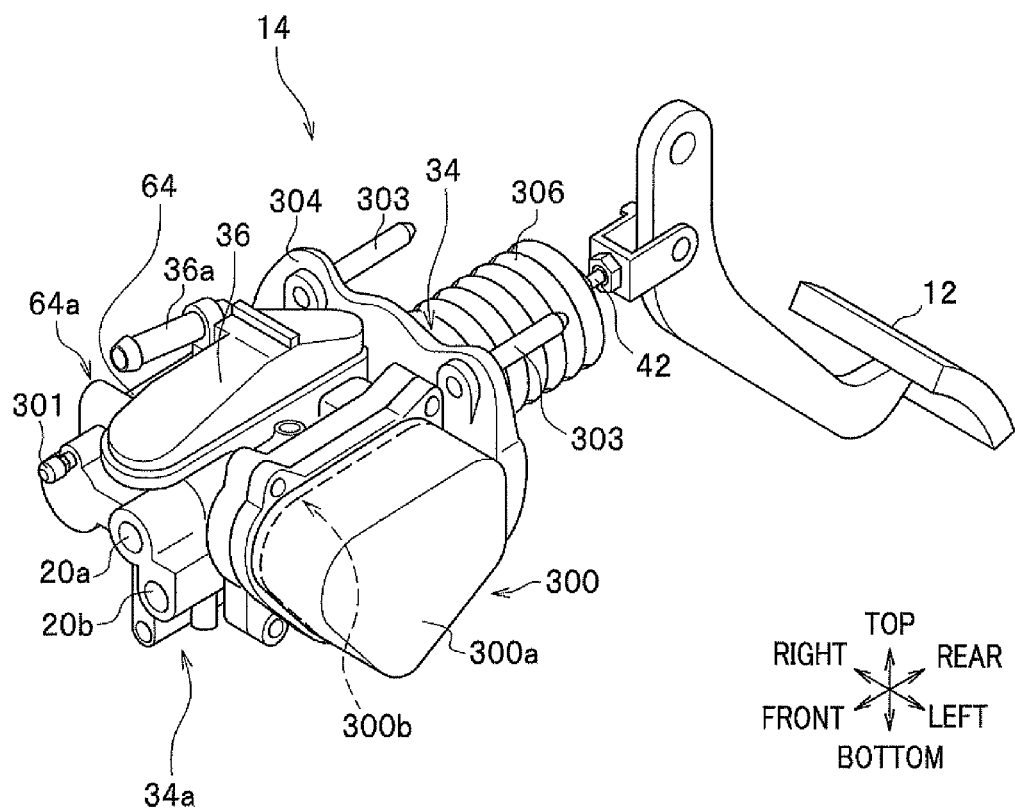
FIG. 4 is a perspective view illustrating a whole input device according to the first embodiment of the present invention.

The following further details an input device 14 of a vehicle brake system 10 according to this embodiment. FIG. 4, which is subsequently examined, is a perspective view illustrating a whole input device according to this embodiment of the present invention.

As illustrated in FIG. 4, the master cylinder 34 included in the input device 14 extends in a front-rear direction of the vehicle V (see FIG. 1). The stroke simulator 64 and this master cylinder 34 are integrated and disposed in parallel. More specifically, the stroke simulator 64 of this embodiment is arranged in parallel at the right side (an outer side in a widthwise direction of the vehicle) of the master cylinder 34. Meanwhile, the master cylinder 34 and the stroke simulator 64 according to this embodiment, as well as a stud plate 304 that supports these members at its rear side, are produced as a metal-made all-in-one molded product. By doing so, a simulator housing 64a, which is an exterior of the stroke simulator 64, and a master cylinder housing 34a, which is an exterior of the master cylinder 34, are formed as a continuous structure.

The first reservoir 36 having an elongated outline is arranged above the master cylinder 34 and the stroke simulator 64, and extends in a front-rear direction between the master cylinder 34 and the stroke simulator 64. This first reservoir 36 is connected via the relief ports 52a and 52b to the first and second pressure chambers 56a and 56b and the back chambers 48a and 48b of the master cylinder 34 as illustrated in FIG. 3. Note that in FIG. 4, the reference sign 36a denotes a connector that connects a base end of the pipe 86 which connects the first reservoir 36 and the second reservoir 84 as illustrated in FIG. 3. This connector 36a is made of a tubular member which projects forward from the input device 14.

In addition, as illustrated in FIG. 4, at the front side of the master cylinder housing 34a are provided a connection port 20a connected to a base end of the pipe 22a which extends toward the joint 23a shown in FIG. 1 and a connection port 20b connected to a base end of the pipe 22d which extends toward the joint 23b shown in FIG. 1.

Also, as illustrated in FIG. 4, a bleeder 301 for air bleeding as detailed below is disposed at the right side of the input device 14, and a sensor unit 300 (a sensor bulb unit; or simply referred to as a bulb unit; hereinafter, the same applies to the term) as detailed below is disposed at the left side of the input device 14.

Further, as illustrated in FIG. 4, the rear terminal of the master cylinder 34 further extends from the stud plate 304 in a rear direction at the rear side of the input device 14. Furthermore, the rear terminal of the master cylinder 34 accepts a first end of the push rod 42 whose second end is attached to the brake pedal 12 as described previously (see FIG. 3). In FIG. 4, the reference sign 306 denotes a boot that covers over the master cylinder 34 and the push rod 42.

Moreover, as described hereinabove, the input device 14 is fixed to the dashboard 2 (see FIG. 1) by using a stud bolt 303 that extends from the stud plate 304 in a rear direction. At that occasion, a portion of the master cylinder 34, which extends from the stud plate 304 in a rear direction, penetrates through the dashboard 2 and extends into the vehicle compartment C (see FIG. 1).

In this regard, however, the input device 14 according to this embodiment is mounted along the slope of the dashboard 2 at its installation position. That is, the master cylinder 34 is inclined in an axial direction so as to have a rising slope toward the front of the vehicle.

Figure 5:
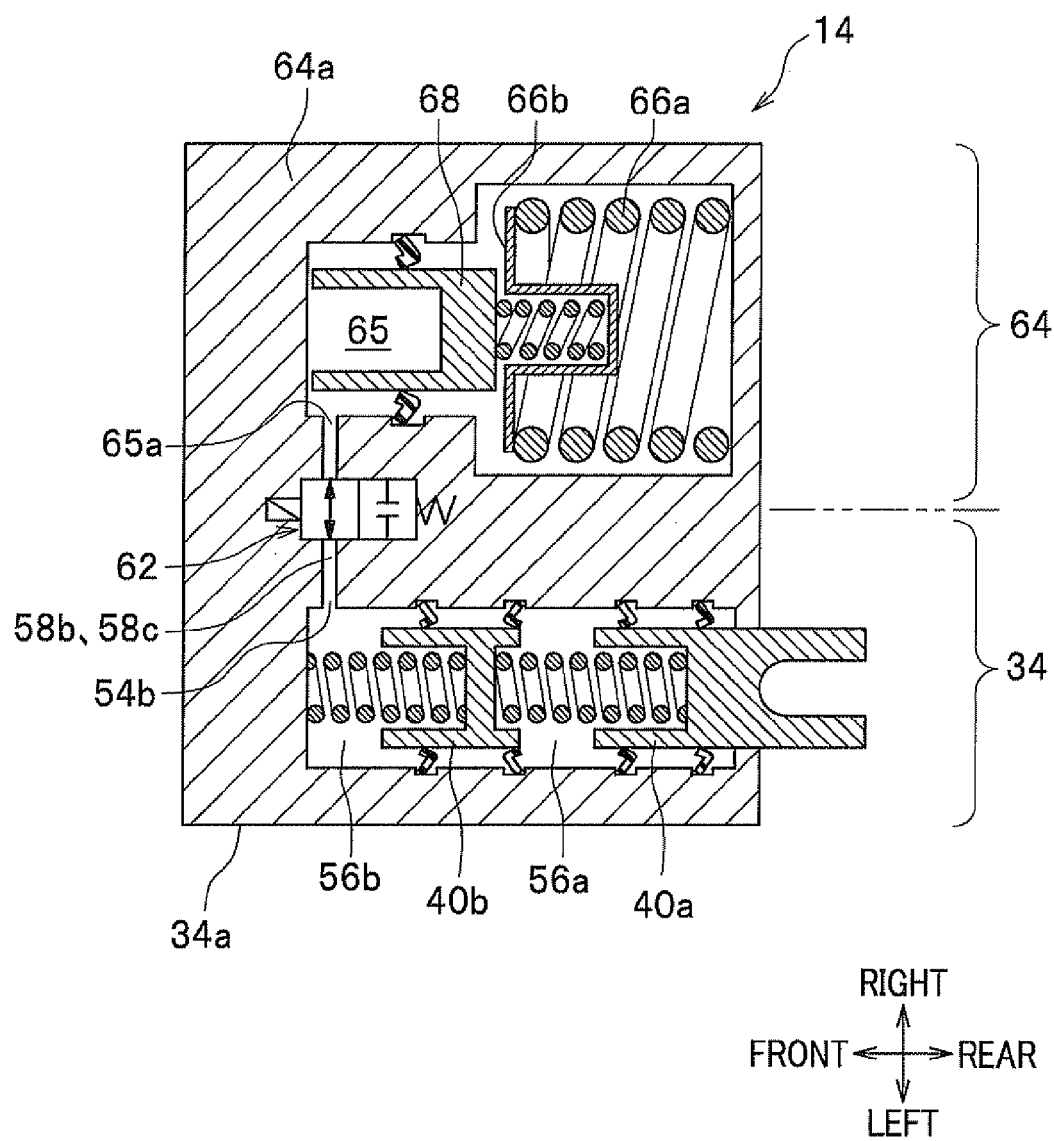
FIG. 5 is a schematic diagram illustrating how to arrange a master cylinder and a stroke simulator included in an input device.

The following further details the internal structure of the input device 14. As illustrated in FIG. 5, a port 65a in communication with the hydraulic chamber 65 of the stroke simulator 64 is connected to an output port 54b in communication with the second pressure chamber 56b of the master cylinder 34. Specifically, as illustrated in FIG. 3, the port 65a of the stroke simulator 64 is connected to the output port 54b formed near the front end of the second pressure chamber 56b, which is disposed ahead of the first pressure chamber 56a.

In addition, as illustrated in FIG. 5, a position of the output port 54b of the master cylinder 34 and a position of the output port 65a of the stroke simulator 64 are almost the same in a front-rear direction. In other words, these ports are produced, with the front end positions of these ports being almost the same.

Meanwhile, the output port 54b and the port 65a are connected each other via the second hydraulic passage 58b (see FIG. 3) and the hydraulic passage branch 58c (see FIG. 3).

Note that in FIG. 5, the reference signs 40a and 40b each denote the above-described piston of the master cylinder 34. The reference sign 62 denotes the third shut-off valve. The reference signs 66a and 66b each denote the above-described return spring of the stroke simulator 64. The reference sign 68 denotes the above-described simulator piston.

Such an input device 14 includes the master cylinder housing 34a and the simulator housing 64a as illustrated in FIG. 5. They further include: the above-described second hydraulic passage 58b, hydraulic passage branch 58c, and third shut-off valve 62; as illustrated in FIG. 3, the first hydraulic passage 58a connecting the connection port 20a to the output port 54a of the master cylinder 34; the first shut-off valve 60a disposed on the first hydraulic passage 58a; and the second shut-off valve 60b disposed on the second hydraulic passage 58b.

Now back to FIG. 4. This input device 14 includes the sensor unit 300 at the left side of the master cylinder 34. In a resin-made housing 300a mounted on the master cylinder housing 34a by using, for example, bolts, this sensor unit 300 includes: as illustrated in FIG. 3, the first hydraulic pressure sensor Pm; the second hydraulic pressure sensor Pp; an electric circuit board 69 as control means for processing a pressure detection signal obtained using these sensors; the first shut-off valve 60a, the second shut-off valve 60b, and the third shut-off valve 62; all of which are illustrated in FIG. 3 and controlled by this electric circuit board 69.

As illustrated in FIG. 4, this input device 14 includes the sensor unit 300 at the left side of the master cylinder 34. In a resin-made housing 300a mounted on the master cylinder housing 34a by using, for example, bolts, this sensor unit 300 includes: as illustrated in FIG. 3, the first hydraulic pressure sensor Pm; the second hydraulic pressure sensor Pp; an electric circuit board 69 as control means for processing a pressure detection signal obtained using these sensors; the first shut-off valve 60a, the second shut-off valve 60b, and the third shut-off valve 62; and the like. The electric circuit board 69 controls opening and closing of the first shut-off valve 60a, the second shut-off valve 60b, and the third shut-off valve 62. The electric circuit board 69 is electrically connected via wires (e.g., power cables) (not shown) to the respective shut-off valves 60a, 60b, and 62 and the respective hydraulic pressure sensors Pm and Pp.

Note that the first hydraulic pressure sensor Pm is connected to the first hydraulic passage 58a (see FIG. 3) and the second hydraulic pressure sensor Pp is connected to the second hydraulic passage 58b (see FIG. 3). In order to achieve this configuration, these sensors are disposed facing monitor holes (not shown) that have been created on the master cylinder housing 34a, so that each sensor can detect each hydraulic pressure described above. In this regard, however, examples of the above monitor hole can include, but are not limited to, a hole created on the master cylinder housing 34a from the sensor unit 300 side as illustrated in FIG. 4.

In addition, such a sensor unit 300 has a fragile portion 300b near the master cylinder 34 to which the sensor unit 300 is attached.

This fragile portion 300b is more preferentially broken and crushed than the other portions when a load with a predetermined weight or more is imposed on the sensor unit 300 from the outside.

Also, the fragile portion 300b according to this embodiment is a thin strip within the housing 300a. The fragile portion 300b, however, is not limited to this shape.

The bleeder 301 for air bleeding as illustrated in FIG. 4 is to bleed the master cylinder 34, the stroke simulator 64, and the hydraulic passages, etc. of air that remains when the master cylinder 34 and the stroke simulator 64 are filled with brake fluid. Examples of this bleeder 301 may include a plug that can close an opening of a passage which faces the outside of the stroke simulator 64 and which is diverged from the hydraulic passage branch 58c between the stroke simulator 64 and the third shut-off valve 62 as illustrated in FIG. 3. As long as the bleeder 300 is configured to bleed the master cylinder 34, etc., of the remaining air, its configuration has no limitation.

The vehicle brake system 10 according to this embodiment is basically constructed as described above. Next, its advantages are described. When the vehicle brake system 10 normally operates, that is, at the normal condition, the first shut-off valve 60a and the second shut-off valve 60b, both of which contain a normally open solenoid valve, are made to be closed by excitation. In addition, the third shut-off valve 62 containing a normally closed solenoid valve is made to be opened by excitation. Because the first shut-off valve 60a and the second shut-off valve 60b block the first hydraulic system 70a and the second hydraulic system 70b, respectively, a brake hydraulic pressure generated in the master cylinder 34 of the input device 14 is not transferred to the wheel cylinders 32FR, 32RL, 32RR, and 32FL of the disk brake mechanisms 30a to 30d.

In this case, the brake hydraulic pressure generated in the second pressure chamber 56b of the master cylinder 34 is transferred to the hydraulic chamber 65 of the stroke simulator 64 by way of the hydraulic passage branch 58c and the third shut-off valve 62 under the open condition. This pressure of the brake fluid supplied to the hydraulic chamber 65 causes the simulator piston 68 to act against the spring force of the return springs 66a and 66b and to be displaced. This displacement allows for a stroke of the brake pedal 12, and produces simulated pedal reaction force to impart the force to the brake pedal 12. This results in a comfortable brake feeling of a driver.

When the control means (not shown) detects a driver's pressing the brake pedal 12 under such a system condition, the control means drives the electric motor 72 of the motor cylinder device 16 to actuate the actuator mechanism 74. Then, the first slave piston 88a and the second slave piston 88a are made to act against the spring force of the first return spring 96a and the second return spring 96b, and the actuator mechanism 74 thus displaces the slave pistons in a direction indicated by the arrow X1 in FIG. 3. Displacing the first slave piston 88a and the second slave piston 88b applies pressure on brake fluid in each of the first hydraulic chamber 98a and the second hydraulic chamber 98b to have a good balance. Eventually, this can generate a desired brake hydraulic pressure.

The brake hydraulic pressures of the first hydraulic chamber 98a and the second hydraulic chamber 98b in this motor cylinder device 16 are transferred via the first and second inner valves 120 and 124, whose valve positions are open in the VSA device 18, to the wheel cylinders 32FR, 32RL, 32RR, and 32FL of the disk brake mechanisms 30a to 30d. Then, the wheel cylinders 32FR, 32RL, 32RR, and 32FL are actuated to produce desired braking force on each wheel.

In other words, in the vehicle brake system 10 according to this embodiment, when the motor cylinder device 16, which functions as a driving hydraulic source, and the by-wire-controlled ECU (not shown), etc., can operate normally (i.e., at the time of normal condition), the master cylinder 34 generates a brake hydraulic pressure by the driver's pressing the brake pedal 12. Then, the communication between the master cylinder 34 and the disk brake mechanisms 30a to 30d (wheel cylinders 32FR, 32RL, 32RR, and 32FL) is blocked by the first shut-off valve 60a and the second shut-off valve 60b. While this blocking condition is maintained, the motor cylinder device 16 generates a brake hydraulic pressure, which is used to actuate the disk brake mechanisms 30a to 30d. Accordingly, this system, what is called a brake-by-wire brake system, gets active. Because of the above, this embodiment is preferably applicable to a vehicle V having no negative pressure generated by a conventional internal-combustion engine. Examples of the vehicle V include an electric vehicle.

In contrast, when the motor cylinder device 16, etc., cannot operate (i.e., at the time of abnormal condition), the first shut-off valve 60a and the second shut-off valve 60b are opened and the third shut-off valve 62 is closed. Then the brake hydraulic pressure generated in the master cylinder 34 is transferred to the disk brake mechanisms 30a to 30d (wheel cylinders 32FR, 32RL, 32RR, and 32FL) to actuate them. Accordingly, this system, what is called an oil-pressure brake system, gets active.

As described above, according to the vehicle brake system 10, the input device 14, the motor cylinder device (electric brake actuator) 16, and the VSA device (vehicle behavior-stabilizing device) 18 are separately disposed from one another in the engine room (room for structures) R. This configuration makes the size of each of the input device 14, the motor cylinder device 16, and the VSA device 18 smaller, and can therefore increase their mounting freedom.

That is, the input device 14 and the motor cylinder device 16 are separated from each other in the engine room R. This configuration can make the size of each device smaller and can make it unnecessary to keep a large empty space. Each device can therefore be mounted even in a narrow empty space.

In addition, the master cylinder 34 and the stroke simulator 64 are integrated into the input device 14, so that a pipe between them can be minimum. Thus, the input device 14 can be made smaller. As a result, the input device 14 according to this embodiment can be mounted on electric and/or hybrid vehicles, etc., whose mounting space is more limited than that of a gasoline-fueled automobile. For example, parts can be shared among the gasoline-fueled automobile, the electric vehicle, and the hybrid vehicle. Thus, the manufacturing cost thereof can be reduced.

By the way, the engine room R includes various structures such as the power device 3 as well as an electrical system, an air intake system, an exhaust system, and a cooling system. Consequently, it is very difficult to procure a large empty space (installation space). According to this embodiment, the input device 14, the motor cylinder device 16, and the VSA device 18 are separated from one another. Consequently, the size of each device (the input device 14, the motor cylinder device 16, and the VSA device 18) can be reduced, so that it is unnecessary to procure a large empty space. This configuration allows each device to be installed even in a narrow empty space inside the engine room R, and makes it easy to deploy each device.

In addition, according to the vehicle brake system 10, the input device 14, the motor cylinder device 16, and the VSA device 18 are separated from one another. This configuration can enhance general-purpose properties of each device (the input device 14, the motor cylinder device 16, and the VSA device 18), thereby making it easier to use each device in different car models.

In addition, according to the vehicle brake system 10, the input device 14, which is fixed to the dashboard, is separately disposed from the motor cylinder device 16. Thus, it is possible to dispose the motor cylinder device 16, which may generate noise and vibration, at a position distal from a driver. This configuration can help prevent the driver from experiencing discomfort (uncomfortable feeling) due to the noise and vibration.

In addition, the vehicle brake system 10 less frequently has an one-sided empty space at either the right or left side of the engine room R in a widthwise direction of a vehicle. Then, the motor cylinder device 16 is disposed at the opposite side of the VSA device 18 in the widthwise direction. This configuration makes it easier to procure an empty space to install these motor cylinder device 16 and the VSA device 18, so that their mounting becomes easy.

Further, in the vehicle brake system 10, the input device 14 is separated from the motor cylinder device 16. The length of this motor cylinder device 16 deployed in the engine room in a front-rear direction can be shorter than a conventional electric servo unit (see, for example, Patent Literature 1) in which a main piston and a booster piston are coaxially disposed. Accordingly, when at least a part of the input device 14 and the power device 3 (e.g., an engine) overlap in the front-rear direction, this configuration makes it possible to secure a more sufficient crash stroke than that of the conventional electric servo unit.

Furthermore, in this vehicle brake system 10, even if the power device 3 moves backward to reach a position of the dashboard 2 at the time of a vehicle V crash, the power device 3 either simultaneously comes into contact with the input device 14 and the dashboard 2 or first contacts the dashboard 2, followed by the input device 14. Thus, if the power device 3 should move backward to reach the position of the dashboard 2, this vehicle brake system 10 helps avoid backward movement of the input device 14 alone. Consequently, when the power device 3 moves backward to reach the position of the dashboard 2, crash safety of the operator (driver) markedly improves.

Moreover, the input device 14 of the vehicle brake system 10 includes the simulator housing 64a between the power device 3 and a portion of the dashboard 2 attached to the master cylinder 34, so that a collision load can be imposed via the simulator housing 64a (simulator 64) on the portion of the dashboard 2 attached to the master cylinder 34. Hence, this vehicle brake system 10 can disperse and reduce the collision load imposed on the dashboard 2. This results in markedly improved crash safety of the operator (driver).

Meanwhile, the input device 14 of the vehicle brake system 10 includes the fragile portion 300b between the dashboard 2 and the power device 3. According to this vehicle brake system 10, the fragile portion 300b is preferentially broken or crushed, so that the load imposed on the input device 14 can be efficiently absorbed. Accordingly, even if the power device 3 moves backward to come into contact with the input device 14 at the time of a vehicle crash, this vehicle brake system 10 can make the power device 3 approach the dashboard 2 while efficiently absorbing the load. This results in markedly improved crash safety of the operator (driver).

In addition, in the vehicle brake system 10, the fragile portion 300b is formed in the housing 300a at a side beside the master cylinder 34. Specifically, the fragile portion 300b is interposed between the master cylinder 34 and a part of the housing 300a including each of the hydraulic pressure sensors Pm and Pp, each of the shut-off valves 60a, 60b, and 62, and the electric circuit board 69. According to the vehicle brake system 10, when the fragile portion 300b formed in the housing 300a is broken or crushed, this configuration helps move all at once each of the hydraulic pressure sensors Pm and Pp, each of the shut-off valves 60a, 60b, and 62, and the electric circuit board 69, all of which are included in the housing 300a. This configuration can therefore prevent a short circuit from occurring in power cables, etc., that electrically connect therebetween.

The following describes advantages of the input device 14 of the vehicle brake system 10.

This input device 14 has the master cylinder 34 which extends in a front-rear direction of the vehicle V (see FIG. 1) as illustrated in FIGS. 4A and 4B. The master cylinder 34 and the stroke simulator 64 are disposed in parallel and integrated. The front end positions of the output port 54b of the master cylinder 34 and the port 65a of the stroke simulator 64 are approximately the same. Thus, this configuration makes it possible to shorten the width and length of each of them and to create a smaller input device 14.

In addition, in such an input device 14, the second hydraulic passage 58b and the hydraulic passage branch 58c, which connect the output port 54b of the master cylinder 34 to the port 65a of the stroke simulator 64, extend from each of the master cylinder 34 and the stroke simulator 64 toward their lateral side. Accordingly, it is possible to shorten the second hydraulic passage 58b and the hydraulic passage branch 58c. Thus, use of this input device 14 enables a smaller input device 14 to be manufactured.

Further, in such an input device 14, the output port 54b of the master cylinder 34 and the port 65a of the stroke simulator 64 are formed at an upper position of each of the master cylinder 34 and the stroke simulator 64. Because of this configuration, when air is removed from the master cylinder 34 and the stroke simulator 64 while the master cylinder 34 and the stroke simulator 64 are filled with brake fluid, it becomes easier to remove the air through the bleeder 301 (see FIG. 4B).

Furthermore, in such an input device 14, the third shut-off valve 62 is built in and disposed partway through the second hydraulic passage 58b that connect the output port 54b of the master cylinder 34 to the port 65a of the stroke simulator 64. In view of the above, this input device 14 can help construct a more simplified vehicle brake system 10 than a vehicle brake system 10 including a third shut-off valve 62 at the outside of an input device 14.

As illustrated in FIG. 4, such an input device 14 has the connector 36a, the connection port 20a, and the connection port 20b, all of which have been formed in a forward direction. This configuration can simplify the step of connecting the pipe 86 (see FIG. 3), the pipe 22a (see FIG. 3), and the pipe 22d (see FIG. 3) to the connector 36a, the connection port 20a, and the connection port 20b, respectively, of the input device 14 attached to the dashboard 2 (see FIG. 1).

Hereinabove, an embodiment according to the present invention has been described. The present invention, however, is not limited to the above embodiment, and various modifications can be reduced into practice.

In the above embodiment, the description refers to the vehicle brake system 10 in which the VSA device 18 arranged in front of the input device 14 stays beside the power device 3. In an embodiment of the present invention, the motor cylinder device 16 may be disposed in front of the input device 14 and may stay beside the power device 3. Alternatively, in an embodiment of the present invention, both the VSA device 18 and the motor cylinder device 16 may be disposed in front of the input device 14 and may stay beside the power device 3. In this case, the VSA device 18 and the motor cylinder device 16 may be closely or distally located.

According to such a vehicle brake system 10, even if the power device 3 moves backward at the time of a vehicle V crash, the VSA device 18 and the motor cylinder device 16 do not interfere with the power device 3. This configuration can therefore secure a sufficient crash stroke while maintaining an increased mounting freedom.

In the above embodiment, the housing 300a for the sensor unit 300 has the fragile portion 300b. In an embodiment of the present invention, however, the fragile portion 300b may be provided between the master cylinder 34 and the sensor unit 300.

(Second Embodiment)

Figure 6:
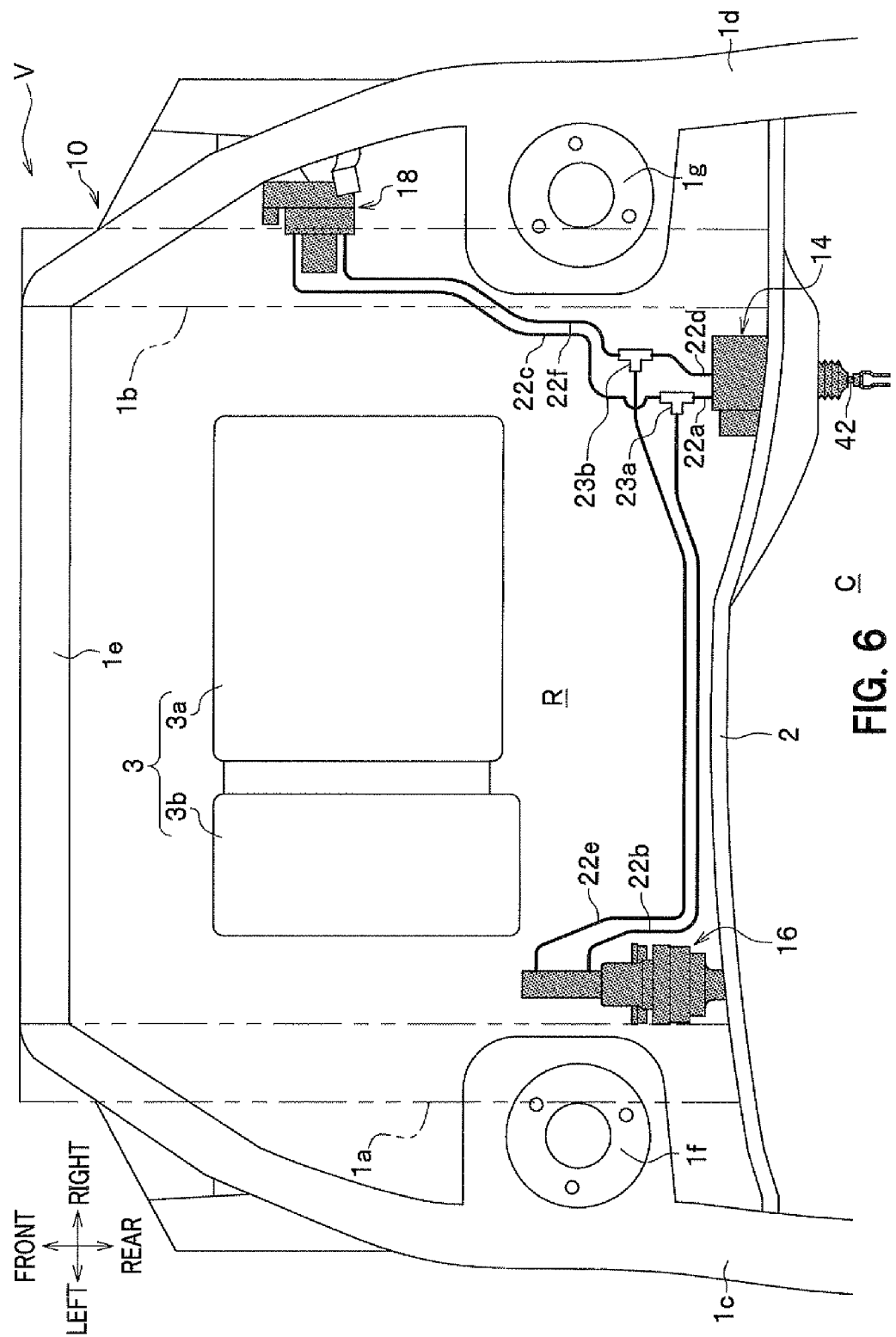
FIG. 6 illustrates how to configure, in a vehicle, a vehicle brake system according to the second embodiment of the present invention.
Figure 7A:
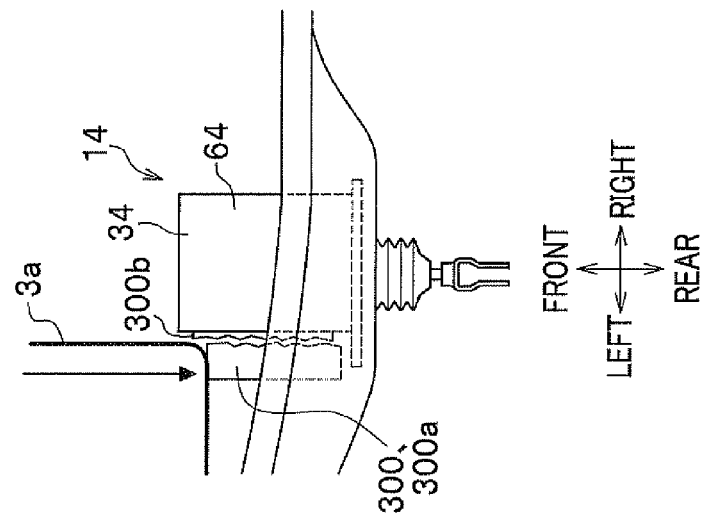
FIG. 7A illustrates a state before backward movement of a power device.
Figure 7B:
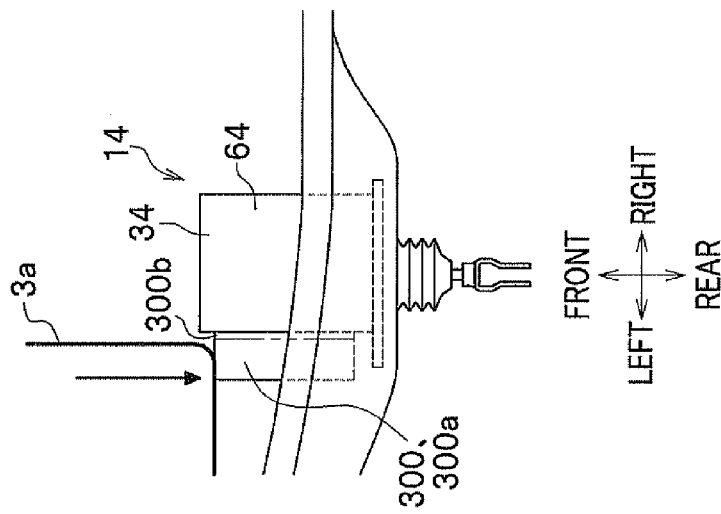
FIG. 7B illustrates a state at which the power device moves backward and comes into contact with a sensor unit (a sensor bulb unit or a bulb unit; hereinafter, the same applies to the term).
Figure 7C:
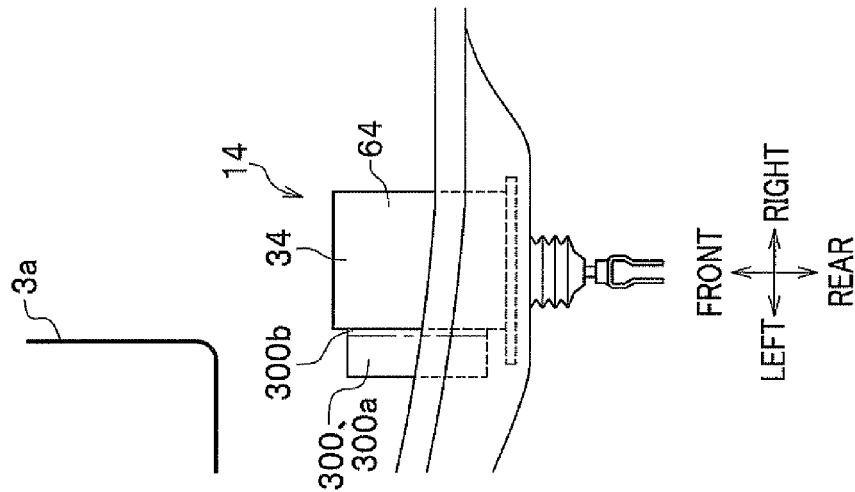
FIG. 7C illustrates a state after the sensor unit has been broken.

The following details the second embodiment of the present invention by appropriately referring to the drawings. Note that components similar to those of the first embodiment have the same reference signs to avoid their detailed description. FIG. 6 illustrates how to configure, in a vehicle, a vehicle brake system according to the second embodiment. FIG. 7 is schematic diagrams illustrating how the vehicle brake system according to the second embodiment looks like when viewed from the top of a vehicle. FIG. 7A illustrates a state before backward movement of a power device. FIG. 7B illustrates a state at which the power device moves backward and comes into contact with a sensor unit (a sensor bulb unit or a bulb unit; hereinafter, the same applies to the term). FIG. 7C illustrates a state after the sensor unit has been broken.

As illustrated in FIG. 6, the vehicle brake system 10 according to this embodiment differs from the vehicle brake system 10 (see FIG. 1) according to the above first embodiment. The input device 14 is positioned in rear of the engine 3a, and only a portion (the sensor unit 300 shown in FIG. 4) of the input device 14 and this engine 3a overlap in a front-rear direction. Except for this configuration, the second embodiment has substantially the same configuration as in the above first embodiment.

The following further details the layout of the input device 14. As illustrated in FIG. 7A, the sensor unit 300 according to this embodiment is disposed in rear of the power device 3, and the sensor unit 300 and the engine 3a of this power device overlap in a front-rear direction. The front end of the other components (e.g., the master cylinder 34) of the input device 14 and the engine 3a do not overlap in a front-rear direction, and is disposed with a distance from the engine 3a.

This vehicle brake system 10 according to this embodiment has advantages similar to those of the vehicle brake system 10 (see FIG. 1) according to the above first embodiment. In addition to those advantages, the following advantages can be exerted. Specifically, as illustrated in FIG. 7B, when external force is imposed on the vehicle V to move the engine 3a backward, the engine 3a fails to come into contact with the master cylinder 34 and other components but comes into contact with the sensor unit 300. When the engine 3a further moves backward, a load due to the engine 3a is imposed on the sensor unit 303. Then, the fragile portion beside the sensor unit 300 is broken, and the sensor unit 300 leaves the master cylinder 34. Accordingly, the load accompanied by the backward movement of the engine 3a are not imposed, and this configuration can therefore secure a sufficient crash stroke.

Note that the master cylinder 34 (master cylinder housing 34a) is made of a metal and the housing 300a for the sensor unit 300 is made of a resin. Thus, the rigidity of the housing 300a is lower than that of the master cylinder 34. Even if the fragile portion 300b is not formed, the sensor unit 300 itself is broken and/or crushed when the external load is imposed on the sensor unit 300.

Hereinabove, the second embodiment according to the present invention has been described. The present invention, however, is not limited to this second embodiment, and various modifications can be reduced into practice.

The mounting position of the sensor unit 300 is not limited to the left side of the master cylinder 34. The mounting position may be at the top or bottom or the left or right of the master cylinder 34 (or the stroke simulator 64 which has been integrated into the master cylinder 34).

Also, the mounting position of the sensor unit 300 may be in front of the master cylinder 34 (or the stroke simulator 64 which has been integrated into the master cylinder 34). According to this vehicle brake system 100, the sensor unit 300 can be deformed as a whole, thereby absorbing the load imposed and decreasing an amount of backward movement induced by the imposed load.

In addition, the position of the sensor unit 300 is not limited to a position at which the power device 3 first contacts the sensor unit 300 when the power device 3 moves backward. This position may be a position at which any of the damper housings 1f and 1g included in the front wheel damper of the vehicle V first contacts the input device 14 when any of the damper housings 1f and 1g moves backward.

Further, the position of the sensor unit 300 is not limited to a position at which the power device 3 or the front wheel damper first contacts the sensor unit 300 when either moves backward. This position may be a position at which a load produced by the power device 3 or the front wheel damper is directly or indirectly imposed on the sensor unit 300 when the power device 3 or the front wheel damper moves backward.

Also, when the front of the vehicle V is collided, the electric circuit board 69 may discontinue, based on the detection results of a crash sensor (not shown) of the vehicle V, the power supply to the first shut-off valve 60a, the second shut-off valve 60b, and the third shut-off valve 62.

(Third Embodiment)

Figure 8:
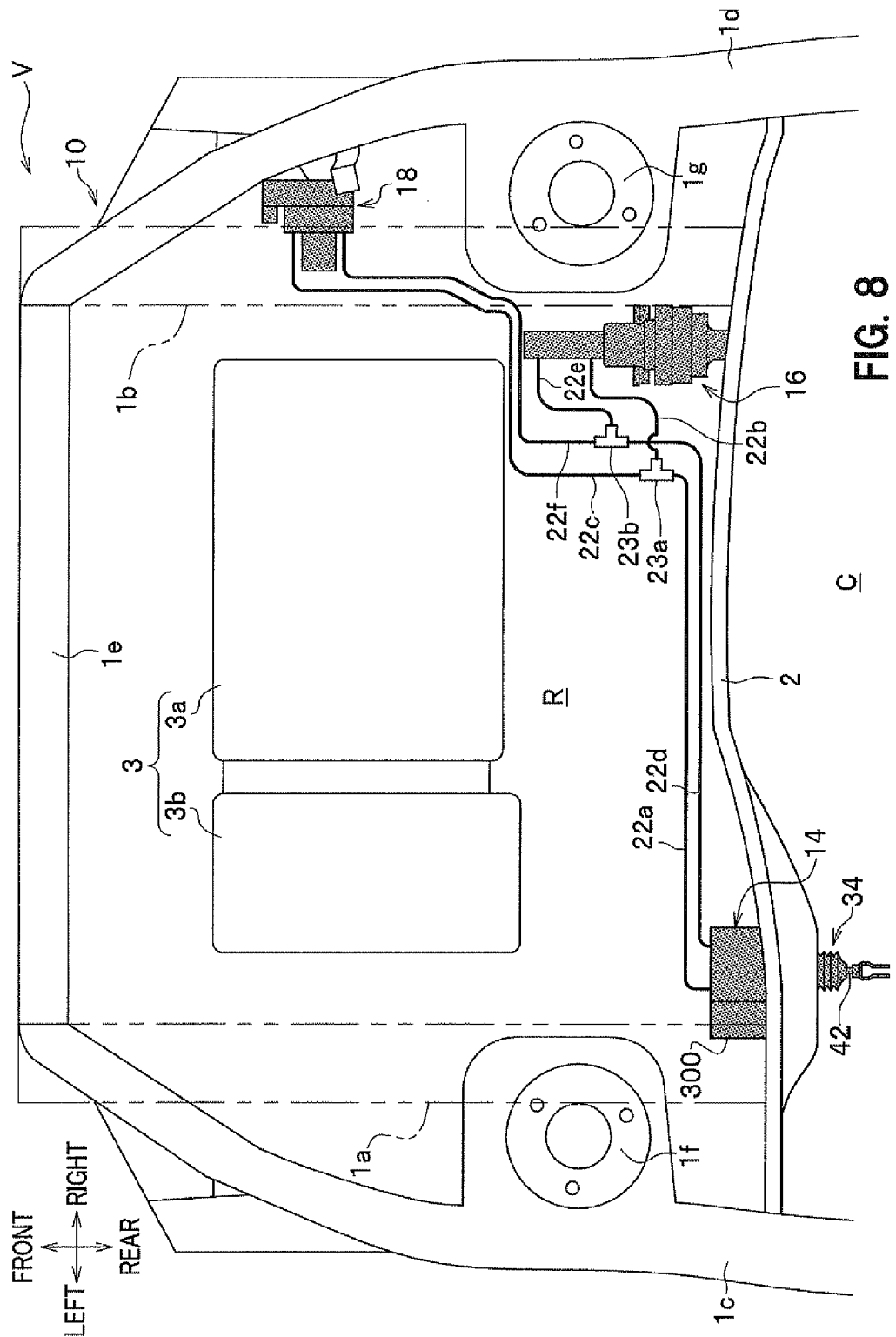
FIG. 8 illustrates how to configure, in a vehicle, a vehicle brake system according to the third embodiment of the present invention.
Figure 9A:
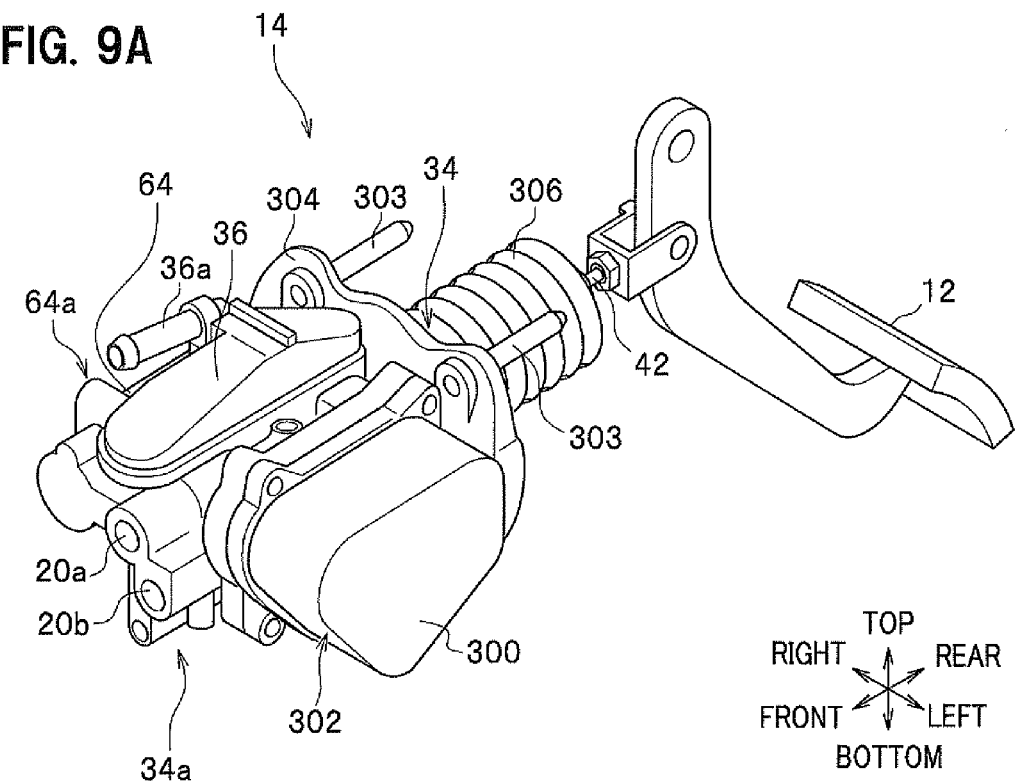
FIG. 9A is a schematic perspective view of an input device according to the third embodiment.
Figure 9B:
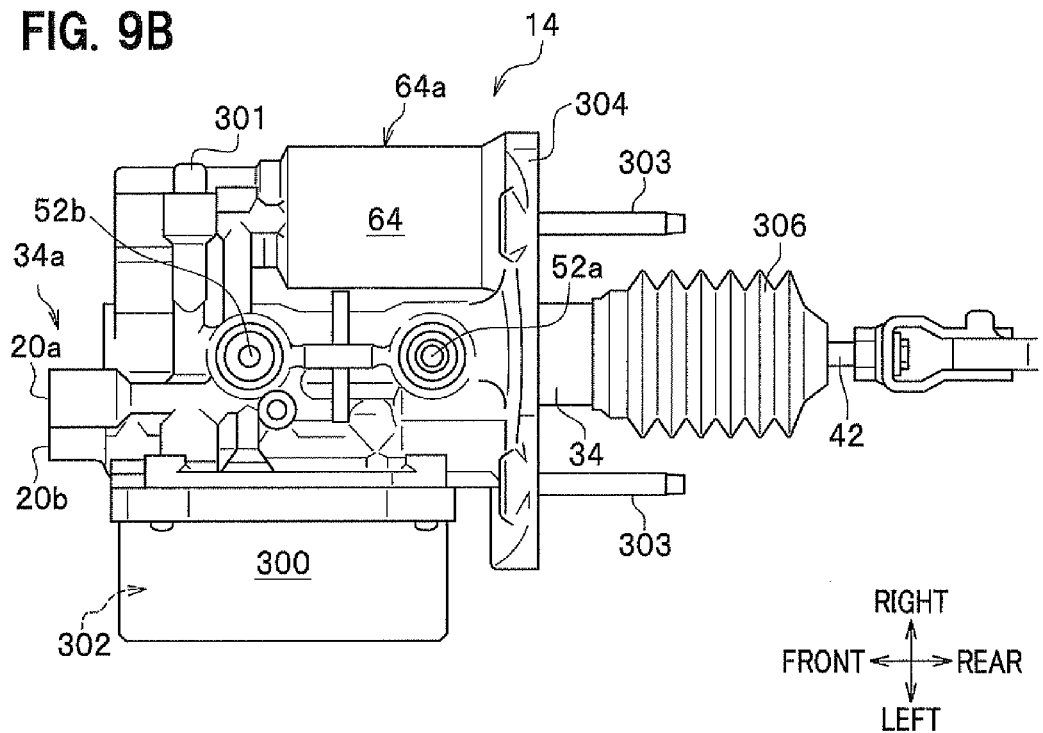
FIG. 9B is a plane view of the input device according to the third embodiment.
Figure 10:
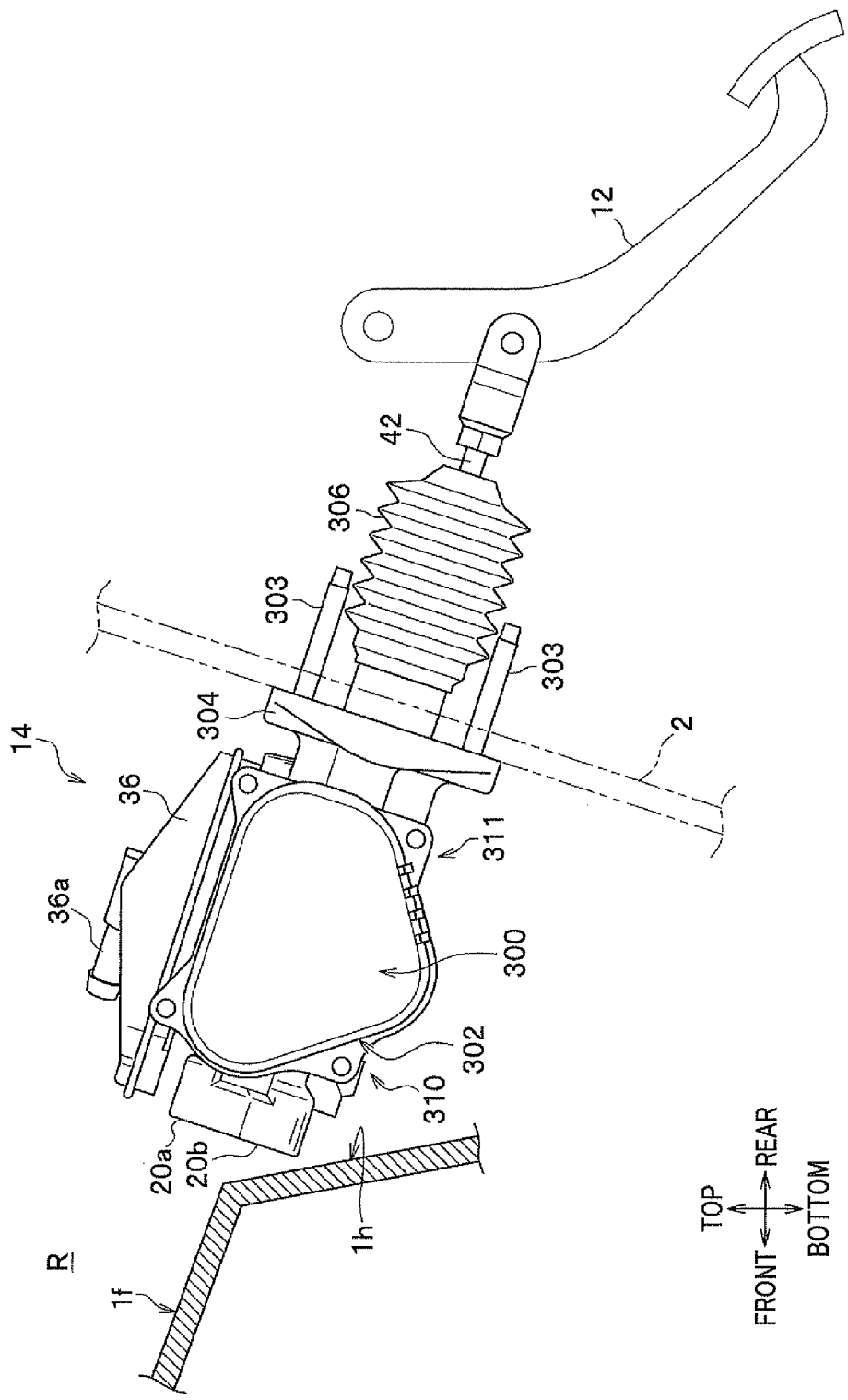
FIG. 10 is a side view illustrating an installation state of an input device according to the third embodiment.

The following details the third embodiment of the present invention by appropriately referring to the drawings. Note that components similar to those of the first and second embodiments have the same reference signs to avoid their detailed description. FIG. 8 illustrates how to configure, in a vehicle, a vehicle brake system according to the third embodiment. FIG. 9A is a schematic perspective view of an input device according to the third embodiment. FIG. 9B is a plane view of the input device according to the third embodiment. For convenience of drawing FIG. 9B, the first reservoir in FIG. 9A is omitted. FIG. 10 is a side view illustrating an installation state of an input device according to the third embodiment. FIG. 11 is a side view illustrating an action when the input device according to the third embodiment is removed.

Note that the following vehicle brake system 10 according to the third embodiment is described by using, as an example, a vehicle which carries a power device 3 in an engine room R, a room for structures. In addition, unless otherwise indicated, the terms "front", "rear", "left", and "right" used herein below refer to each reference direction in FIG. 8, the direction having agreement with each direction of the vehicle V.

As illustrated in FIG. 8, a vehicle brake system 10 according to this embodiment differs from the vehicle brake system 10 (see FIG. 1) according to the above first embodiment. The input device 14 is used in a left-hand drive vehicle, and is mounted using bolts on the dashboard 2 at the left side in a widthwise direction of the vehicle. The push rod 42 connected to the brake pedal 12 (see FIG. 3) penetrates through the dashboard 2 to project into the vehicle compartment C.

Note that the following further details the structure and arrangement of the input device 14.

The motor cylinder device 16 is disposed at the right side, the opposite side of the input device 14 in a widthwise direction of the vehicle. For example, the motor cylinder device 16 is mounted via a bracket (not shown) on the right front side frame 1b. Specifically, the motor cylinder device 16 has an elastic (floating) support on the bracket. A fastener member such as a bolt is used to fasten the bracket on the front side frame 1b. This configuration makes it possible to absorb vibration, etc., generated during operation of the motor cylinder device 16.

Examples of a function of the VSA device 18 include: an ABS (anti-lock brake system) function which prevents wheel lock during braking; a TCS (traction control system) function which prevents wheel spinning during acceleration, etc.; and a function which reduces skid during turning. The VSA device 18 is mounted via, for example, a bracket on a vehicle body at the front right side in a widthwise direction of the vehicle. Note that an ABS device which has only the ABS (anti-lock brake system) function to prevent wheel lock during braking can be connected and used as an alternative for the VSA device 18.

These input device 14, motor cylinder device 16, and VSA device 18 are connected via hydraulic passages constructed using, for example, metal-made pipe members. These devices constitute a by-wire brake system, and a harness (not shown) is used to electrically connect the input device 14 and the motor cylinder device 16.

Specifically, the input device 14 and the VSA device 18 are connected each other via the pipe 22a, the joint (a pipe with three branches) 23a, and the pipe 22c as the first hydraulic system 70a (see FIG. 3), and via the pipe 22d, the joint (a pipe with three branches) 23b, and the pipe 22f as the second hydraulic system 70a (see FIG. 3).

In addition, the motor cylinder device 16 is connected via the pipe 22b to the joint 23a as the first hydraulic system 70a (see FIG. 3) and is connected via the pipe 22e to the joint 23b as the second hydraulic system 70b (see FIG. 3).

The hydraulic passages of the vehicle brake system 10 according to this embodiment include substantially the same hydraulic passages according to the above first embodiment as illustrated in FIG. 3. Thus, the detailed description is omitted herein.

In this regard, however, the schematic diagram in FIG. 3 illustrates the stroke simulator 64 under the master cylinder 34, but it is supposed in the input device 14 according to this embodiment that the stroke simulator 64 and the master cylinder 34 are disposed in parallel in the left-to-right direction of FIG. 8.

<Input Device>

The following illustrates FIGS. 9 to 11, and specifically describes the configuration of an input device 14 of a vehicle brake system 10 according to this embodiment (hereinafter, appropriately referred to as "the input device 14 according to this embodiment").

As illustrated in FIGS. 9A and 9B, the master cylinder 34 included in the input device 14 extends in a front-rear direction of the vehicle V (see FIG. 8). The stroke simulator 64 and this master cylinder 34 are integrated and disposed in parallel. More specifically, the stroke simulator 64 of this embodiment is arranged in parallel at the right side (an outer side in a widthwise direction of the vehicle) of the master cylinder 34. Meanwhile, the master cylinder 34 and the stroke simulator 64 according to this embodiment, as well as a stud plate 304 that supports these members at its rear side, are produced as a metal-made all-in-one molded product. By doing so, a simulator housing 64a, which is an exterior of the stroke simulator 64, and a master cylinder housing 34a, which is an exterior of the master cylinder 34, are formed as a continuous structure.

The first reservoir 36 (see FIG. 9A) having an elongated outline is arranged above the master cylinder 34 and the stroke simulator 64, and extends in a front-rear direction between the master cylinder 34 and the stroke simulator 64. This first reservoir 36 is connected via the relief ports 52a and 52b illustrated in FIG. 9B to the first and second pressure chambers 56a and 56b and the back chambers 48a and 48b of the master cylinder 34 as illustrated in FIG. 3. Note that in FIG. 9A, the reference sign 36a denotes a connector that connects a base end of the pipe 86 (see FIG. 3) which connects the first reservoir 36 and the second reservoir 84 as illustrated in FIG. 3. This connector 36a is made of a tubular member which projects forward from the input device 14.

In addition, as illustrated in FIGS. 9A and 9B, at the front side of the master cylinder housing 34a are provided a connection port 20a connected to a base end of the pipe 22a which extends toward the joint 23a shown in FIG. 8 and a connection port 20b connected to a base end of the pipe 22d which extends toward the joint 23b shown in FIG. 8.

Also, as illustrated in FIGS. 9A and 9B, a bleeder 301 for air bleeding and a sensor unit 300 are disposed at the right and the left side, respectively, of the input device 14.

Further, as illustrated in FIGS. 9A and 9B, the rear terminal of the master cylinder 34 further extends from the stud plate 304 in a rear direction at the rear side of the input device 14. Furthermore, the rear terminal of the master cylinder 34 accepts a first end of the push rod 42 whose second end is attached to the brake pedal 12 as described previously (see FIG. 3). In FIGS. 9A and 9B, the reference sign 306 denotes a boot that covers over the master cylinder 34 and the push rod 42.

Moreover, as described hereinabove, the input device 14 is fixed to the dashboard 2 (see FIG. 8) by using a stud bolt 303 that extends from the stud plate 304 in a rear direction. At that occasion, a portion of the master cylinder 34, which extends from the stud plate 304 in a rear direction, penetrates through the dashboard 2 and extends into the vehicle compartment C (see FIG. 8).

In a resin-made housing, the sensor unit 300 includes: the first hydraulic pressure sensor Pm and the second hydraulic pressure sensor Pp as illustrated in FIG. 3; the electric circuit board (not shown) for processing a pressure detection signal as obtained with these sensors; and the first shut-off valve 60a, the second shut-off valve 60b, and the third shut-off valve 62 (any of the valves is controlled by the above electric circuit board) as illustrated in FIG. 3. Note that the first hydraulic pressure sensor Pm and the second hydraulic pressure sensor Pp are disposed facing monitor holes (not shown) that are in communication with the first hydraulic passage 58a and the second hydraulic passage 58b, respectively. By doing so, the sensors can detect each hydraulic pressure as described above. In this regard, however, the monitor holes are created as holes that are directed from the sensor unit 300 toward the first hydraulic passage 58a and the second hydraulic passage 58b.

As illustrated in FIG. 10, the sensor unit 300 has such a shape that as the position goes down, the shape becomes narrower when viewed from a side. A slope 302 is formed at a portion (a portion at the side denoted by the "310") at the opposite side of the side at which the dashboard 2 is attached in a front-rear direction of the vehicle.

As described above, this slope 302 has such a shape that as the position of the sensor unit 300 goes down, the shape becomes narrower. Accordingly, the shape looks like a downward slope from the front portion 310 to the rear portion 311. This slope 302 has an inclined surface disposed along an inclined surface 1h of the damper housing 1f, a structure included in the engine room R. Such a slope 302 functions as a run off used to avoid contact with the damper housing 1f when the input device 14 attached to the dashboard 2 is removed during the subsequent maintenance, etc.

Specifically, when the input device 14 is detached from the dashboard 2, the input device 14 is lifted and pulled in a top-front direction of the engine room R while the slope 302 of the sensor unit 300 is moved along the inclined surface 1h of the damper housing 1f in the engine room R as illustrated in FIG. 11. By doing so, the slope 302 of the sensor unit 300 does not come into contact with the inclined surface 1h of the damper housing 1f. Then, the input device 14 is withdrawn along the slope in a top-front direction of the engine room R (in FIG. 11, the bold arrow denotes that as the input device 14 is moved, the input device 14 can be pulled out in such a manner as partially depicted by the chain double-dashed line in the drawing).

Here, the following supposes a case where the sensor unit 300 does not have such a slope 302. Even if the input device 14 is pulled out while being lifted so as to remove the input device 14 during its maintenance, etc., the front portion 310 of the sensor unit 300 is going to come into contact with the inclined surface 1h of the damper housing 1f. This inclined surface hampers the operation, so that the input device 14 cannot be efficiently removed. This results in the following design necessities so as to enable the detachment: the entire length of the input device 14 is made shorter; and the shape of the inclined surface 1h of the damper housing 1f and/or the shape of the dashboard 2 are altered.

In contrast, the slope according to this embodiment makes it possible to withdraw the input device 14 along the inclined surface 1h of the damper housing 1f. This slope 302 is formed in the sensor unit 300. Accordingly, the input device 14 is moved in a top-front direction in the engine room R while the slope 302 is moved along the inclined surface 1h of the damper housing 1f. By doing so, the input device 14 is suitably pulled out from the dashboard 2 and removed. Hence, the maintenance of the input device 14 can be performed without any of the above-described complicated design changes.

This vehicle brake system 10 according to this embodiment has advantages similar to those of the vehicle brake system 10 (see FIG. 1) according to the above first embodiment. In addition to those advantages, the following advantages can be exerted. The input device 14 according to this embodiment is attached to the dashboard 2. The front portion 310 is positioned at the opposite side of the side at which the input device 14 is attached to the dashboard 2 in a front-rear direction of the vehicle. This front portion 310 has the slope 302 which makes it possible to pull out the input device 14 along the damper housing 1f, a structure included in the engine room R. Accordingly, when the input device 14 is removed from the dashboard 2 at maintenance, etc., the operation can be easily performed.

That is, when the input device 14 is removed from the dashboard 2, the input device 14 can be pulled out along the slope 302 against the inclined surface 1h of the damper housing 1f in a top-front direction. This configuration makes it possible to suitably remove the input device 14 from the dashboard 2 while avoiding contact with the damper housing 1f. This configuration is therefore excellent in maintenance properties.

Also, when the input device 14 is removed from the dashboard 2, the sensor unit 300 does not present a hindrance to the structure. Consequently, the input device 14 is suitably equipped with the sensor unit 300 at its side, thereby increasing a design choice of its own.

In the above embodiment, the sensor unit 300 has the slope 302, but the configuration is not limited to this. The slope 302 may be formed at the side of the stroke simulator 64, depending on installation conditions of other structures in the engine room R.

According to this configuration, when the input device 14 is removed from the dashboard 2, the input device 14 is pulled out along the slope 302 formed at the stroke simulator 64 side against other structures in a top-front direction in the engine room R. By doing so, this configuration makes it possible to suitably remove the input device 14 from the dashboard 2 while avoiding the other structures.

Also, when the input device 14 is removed from the dashboard 2, the stroke simulator 64 side does not present a hindrance to the other structures. This configuration allows the master cylinder 34 to be suitably disposed in parallel to the stroke simulator 64, thereby increasing a design choice of the input device 14.

Both the sensor unit 300 side and the stroke simulator 64 side may each have a slope 302.

Note that when a structure is present in a top-front direction to the input device 14, the upper surface of the sensor unit 300 may have a slope 302. Alternatively, the slope 302 may be formed on the upper surface of the simulator housing 64a at the stroke simulator 64 side. In this case, the input device 14 is pulled out along the structure in a bottom-front direction.

By doing so, this configuration makes it possible to suitably remove the input device 14 from the dashboard 2 while avoiding the structure.

Note that examples of the structure include various devices such as a motor 3b equipped with the engine 3a and additional structures (e.g., brake-related devices, as well as, a transmission, a cooling system (e.g., a radiator), a low-voltage battery). The input device 14 can be suitably pulled out along the slope 302 against these structures.

Thus, the input device 14 easily removable at maintenance, etc., can be suitably arranged around these structures without largely modifying a layout of the structures included in the engine room R.

REFERENCE SIGNS LIST

1f Damper housing (Structure)
2 Dashboard
3 Power device
3a Engine
3b Motor
10 Vehicle brake system
12 Brake pedal (Brake operator)
14 Input device
16 Motor cylinder device (Electric brake actuator)
18 VSA device (Vehicle behavior-stabilizing device)
20a Connection port
20b Connection port
22a Pipe
22b Pipe
22c Pipe
22d Pipe
22e Pipe
22f Pipe
23a Joint
23b Joint
24a Output port
24b Output port
26a Inlet port
26b Inlet port
34 Master cylinder
34a Master cylinder housing
54a Output port
54b Output port
58a First hydraulic passage
58b Second hydraulic passage
58c Hydraulic passage branch
60a First shut-off valve
60b Second shut-off valve
62 Third shut-off valve
64 Stroke simulator
64a Simulator housing
65 Hydraulic chamber
65a Port
70a First hydraulic system
70b Second hydraulic system
72 Electric motor
84 Second reservoir
300 Sensor unit
300b Fragile portion
302 Slope
C Vehicle compartment
Pm Pressure sensor
Pp Pressure sensor
R Engine room (Room having a power device)
V Vehicle

The invention claimed is:

1. A vehicle brake system, comprising:
an input device which receives an operator's brake operation; and
an electric brake actuator which generates a brake hydraulic pressure based on an electric signal according to at least the brake operation,
wherein:
the input device and the electric brake actuator are separately disposed from each other in a room having a power device, the room being partitioned in front of a dashboard;
the input device is disposed in rear of the power device;
at least a part of the input device and the power device overlap in a front-rear direction; and
the input device keeps a front end position of the input device either at substantially the same as a front tip position of the dashboard or at a more rear position than the front tip position so as to adjust the front end position in a front-rear direction.

2. The vehicle brake system according to claim 1, wherein the input device comprises:
a master cylinder attached to the dashboard, a portion of the master cylinder penetrating through the dashboard; and
a simulator housing disposed between the dashboard and the power device.

3. The vehicle brake system according to claim 1, wherein the input device comprises a fragile portion between the dashboard and the power device.

4. The vehicle brake system according to claim 3, wherein the input device further comprises a sensor unit disposed in parallel to the master cylinder; and
the fragile portion is interposed between the master cylinder and the sensor unit.

5. The vehicle brake system according to claim 1, wherein the input device comprises: a master cylinder attached to the dashboard, a portion of the master cylinder penetrating through the dashboard; and a sensor unit attached to the master cylinder,
wherein the sensor unit is disposed at a position in which a load is imposed through the power device or a front wheel damper of a vehicle when the power device or the front wheel damper moves backward.

6. The vehicle brake system according to claim 5, wherein the sensor unit comprises a fragile portion.

7. The vehicle brake system according to claim 6, wherein the sensor unit further comprises:
a valve disposed on a hydraulic passage extending from the master cylinder;
an electric circuit board electrically connected to the valve;
a housing attached to the master cylinder, the housing including the valve and the electric circuit board,
wherein the fragile portion is formed in the housing at a side beside the master cylinder.

8. The vehicle brake system according to claim 1, wherein the input device is attached to the dashboard; and
a slope is formed at an opposite side of a side at which the input device is attached to the dashboard in a front-rear direction, the slope making it possible to pull out the input device along a structure included in the room for structures.

9. The vehicle brake system according to claim 8, wherein the input device comprises a sensor unit; and
the slope is formed at the sensor unit.

10. The vehicle brake system according to claim 9, wherein the input device comprises: a master cylinder; and a stroke simulator disposed in parallel to the master cylinder, the stroke simulator giving a brake operator a simulated operation reaction force, wherein the slope is formed at a stroke simulator side.

11. The vehicle brake system according to claim 9, wherein the structure is a damper housing.

12. The vehicle brake system according to claim 9, wherein the structure is auxiliary equipment included in the power device.

13. The vehicle brake system according to claim 8, wherein the input device comprises: a master cylinder; and a stroke simulator disposed in parallel to the master cylinder, the stroke simulator giving a brake operator a simulated operation reaction force, wherein the slope is formed at a stroke simulator side.

14. The vehicle brake system according to claim 8, wherein the structure is a damper housing.

15. The vehicle brake system according to claim 8, wherein the structure is auxiliary equipment included in the power device.

16. A vehicle brake system in a vehicle, comprising:
an input device which receives an operator's brake operation; and
an electric brake actuator which generates a brake hydraulic pressure based on an electric signal according to at least the brake operation,
wherein:
the input device and the electric brake actuator are separately disposed from each other in a room having a power device, said power device being operable to generate force for driving wheels of the vehicle, the room being partitioned in front of a dashboard;
the input device is disposed proximate a rear portion of the power device;
at least a part of the input device and the power device overlap in a front-rear direction; and
the electric brake actuator is disposed in front of the input device and at a lateral side of the power device, said lateral side being an opposite side of the power device from a side where the input device is situated.

17. The vehicle brake system according to claim 16, wherein the input device comprises:
a master cylinder attached to the dashboard, a portion of the master cylinder penetrating through the dashboard; and
a simulator housing disposed between the dashboard and the power device.

18. The vehicle brake system according to claim 16, wherein the input device comprises a fragile portion between the dashboard and the power device.

19. The vehicle brake system according to claim 18, wherein the input device further comprises a sensor unit disposed in parallel to the master cylinder; and
the fragile portion is interposed between the master cylinder and the sensor unit.

20. The vehicle brake system according to claim 16, wherein the input device comprises: a master cylinder attached to the dashboard, a portion of the master cylinder penetrating through the dashboard; and a sensor unit attached to the master cylinder,
wherein the sensor unit is disposed at a position in which a load is imposed through the power device or a front wheel damper of a vehicle when the power device or the front wheel damper moves backward.

21. The vehicle brake system according to claim 20, wherein the sensor unit comprises a fragile portion.

22. The vehicle brake system according to claim 21, wherein the sensor unit further comprises:
a valve disposed on a hydraulic passage extending from the master cylinder;
an electric circuit board electrically connected to the valve;
a housing attached to the master cylinder, the housing including the valve and the electric circuit board,
wherein the fragile portion is formed in the housing at a side beside the master cylinder.

23. The vehicle brake system according to claim 16, wherein the input device is attached to the dashboard; and
a slope is formed at an opposite side of a side at which the input device is attached to the dashboard in a front-rear direction, the slope making it possible to pull out the input device along a structure included in the room for structures.

24. The vehicle brake system according to claim 23, wherein the input device comprises a sensor unit; and
the slope is formed at the sensor unit.

25. The vehicle brake system according to claim 24, wherein the input device comprises: a master cylinder; and a stroke simulator disposed in parallel to the master cylinder, the stroke simulator giving a brake operator a simulated operation reaction force, wherein the slope is formed at a stroke simulator side.

26. The vehicle brake system according to claim 24, wherein the structure is a damper housing.

27. The vehicle brake system according to claim 24, wherein the structure is auxiliary equipment included in the power device.

28. The vehicle brake system according to claim 23, wherein the input device comprises: a master cylinder; and a stroke simulator disposed in parallel to the master cylinder, the stroke simulator giving a brake operator a simulated operation reaction force, wherein the slope is formed at a stroke simulator side.

29. The vehicle brake system according to claim 23, wherein the structure is a damper housing.

30. The vehicle brake system according to claim 23, wherein the structure is auxiliary equipment included in the power device.

* * * * *